(12) United States Patent
Mizuno et al.

(10) Patent No.: US 10,503,511 B2
(45) Date of Patent: *Dec. 10, 2019

(54) CIRCUIT, SYSTEM, AND METHOD FOR DETERMINING WHETHER A BRANCH INSTRUCTION IS PREDICTED BASED ON A CAPTURE RANGE OF A SECOND INSTRUCTION

(71) Applicant: Texas Instruments Incorporated, Dallas, TX (US)

(72) Inventors: Hiroyuki Mizuno, Tokyo (JP); Yoann Foucher, Portland, OR (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 476 days.

This patent is subject to a terminal disclaimer.

(21) Appl. No.: 15/169,277

(22) Filed: May 31, 2016

(65) Prior Publication Data

US 2016/0274914 A1    Sep. 22, 2016

Related U.S. Application Data

(62) Division of application No. 12/236,674, filed on Sep. 24, 2008, now Pat. No. 9,384,003.

(Continued)

(51) Int. Cl.
*G06F 9/38* (2018.01)
*G06F 9/30* (2018.01)

(52) U.S. Cl.
CPC .......... *G06F 9/3806* (2013.01); *G06F 9/3004* (2013.01); *G06F 9/30058* (2013.01);
(Continued)

(58) Field of Classification Search
CPC ..... G06F 9/3842–3848; G06F 9/30189; G06F 9/3802; G06F 9/3804
(Continued)

(56) References Cited

U.S. PATENT DOCUMENTS 5,479,616 A * 12/1995 Garibay, Jr. .......... G06F 9/3802
  712/212
5,805,878 A *  9/1998 Rahman ................ G06F 9/3806
  712/239
(Continued)

OTHER PUBLICATIONS

Ti (TMS320C67x/C67x+ DSP CPU and Instruction Set Reference Guide), Literature Number: SPRU733, 465 pages, May 2005 (Year: 2005).*

(Continued)

*Primary Examiner* — Keith E Vicary
(74) *Attorney, Agent, or Firm* — Brian D. Graham; Charles A. Brill; Frand D. Cimino

(57) ABSTRACT

A processor is provided for use with a memory having selectable memory areas. In an example, the processor includes a memory area selection circuit (MMU) to select one of the selectable memory areas, and an instruction fetch circuit to fetch a target instruction at an address from the selected memory area. The processor includes an execution circuit (Pipeline) to execute instructions from the instruction fetch circuit and to execute a first instruction for changing the selection by the MMU to a second selectable memory area. The Pipeline executes a branch instruction that points to a target instruction, where access to the target instruction depends on actual change of selection to the second memory area. The processor also includes a logic circuit to ensure fetch of the target instruction in response to the branch instruction after actual change of selection. Other circuits, devices, systems, apparatus, and processes are also disclosed.

19 Claims, 18 Drawing Sheets

Related U.S. Application Data

(60) Provisional application No. 60/981,896, filed on Oct. 23, 2007.

(52) U.S. Cl.
CPC ...... G06F 9/30185 (2013.01); G06F 9/30189 (2013.01); G06F 9/3802 (2013.01); G06F 9/382 (2013.01); G06F 9/3844 (2013.01); G06F 9/3861 (2013.01)

(58) Field of Classification Search
USPC .................................................. 712/216–219
See application file for complete search history.

(56) References Cited

U.S. PATENT DOCUMENTS

| | | | |
|---|---|---|---|
| 5,809,566 A * | 9/1998 | Charney | G06F 9/3802 711/204 |
| 6,006,325 A * | 12/1999 | Burger | G06F 9/30087 712/214 |
| 6,560,754 B1 * | 5/2003 | Hakewill | G06F 9/30094 712/216 |
| 6,795,911 B1 * | 9/2004 | Miyano | G06F 9/3004 711/5 |
| 9,384,003 B2 * | 7/2016 | Mizuno | G06F 9/3802 |
| 2003/0186469 A1 * | 10/2003 | Fonstad, Jr. | H01L 21/2007 438/3 |
| 2004/0049660 A1 * | 3/2004 | Jeppesen | G06F 9/3836 712/219 |
| 2004/0120317 A1 * | 6/2004 | Forssell | H04L 47/14 370/394 |
| 2007/0022277 A1 * | 1/2007 | Iwamura | G06F 9/30181 712/229 |
| 2009/0089564 A1 * | 4/2009 | Brickell | G06F 9/30003 712/239 |

OTHER PUBLICATIONS

Scholz et al. (Minimizing Bank Selection Instructions for Partitioned Memory Architectures); Cases '06 Proceedings of the 2006 international conference on Compilers, architecture and synthesis for embedded systems; Oct. 23-25, 2006; 11 pages (Year: 2006).*

* cited by examiner

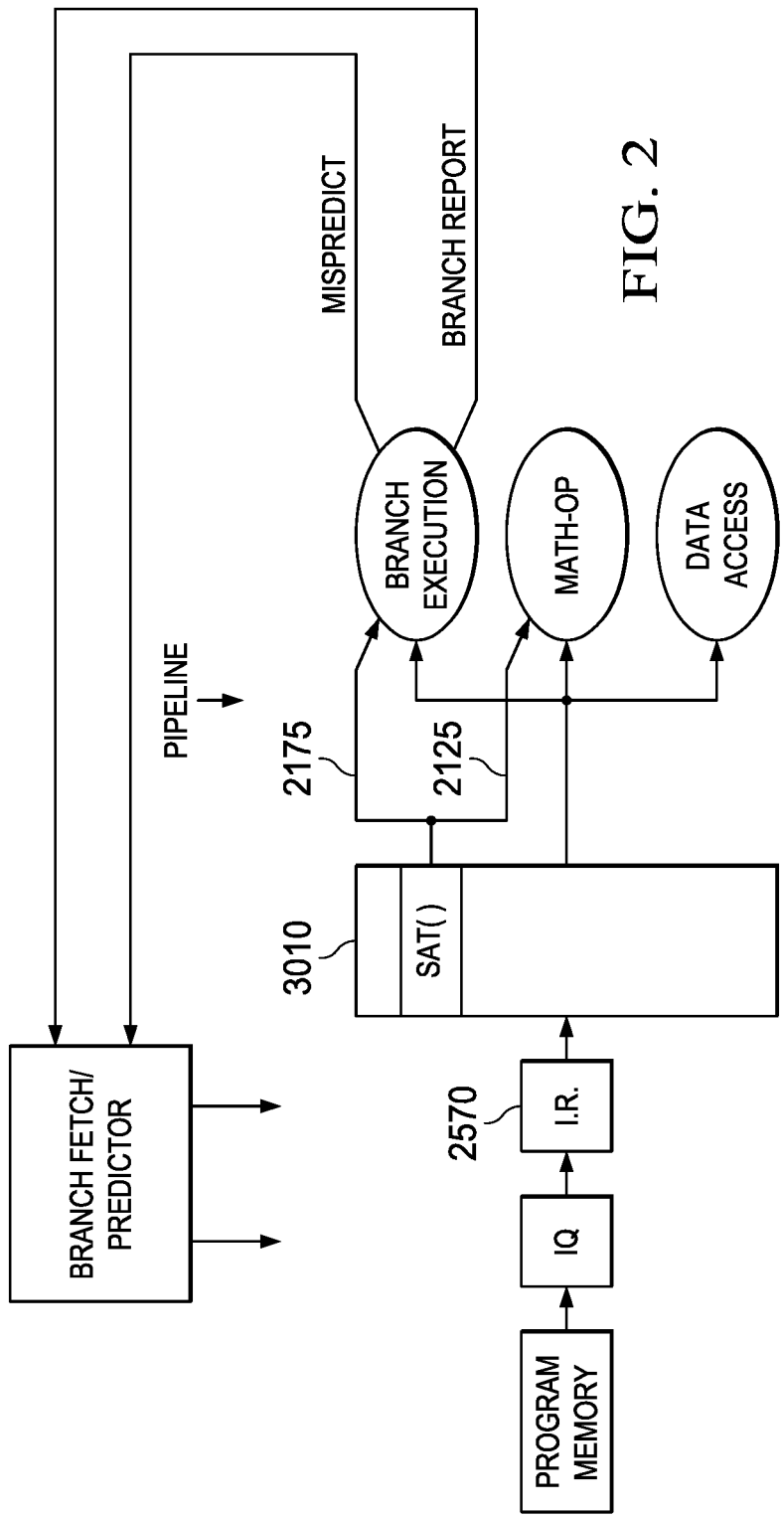

FROM FIG. 3A

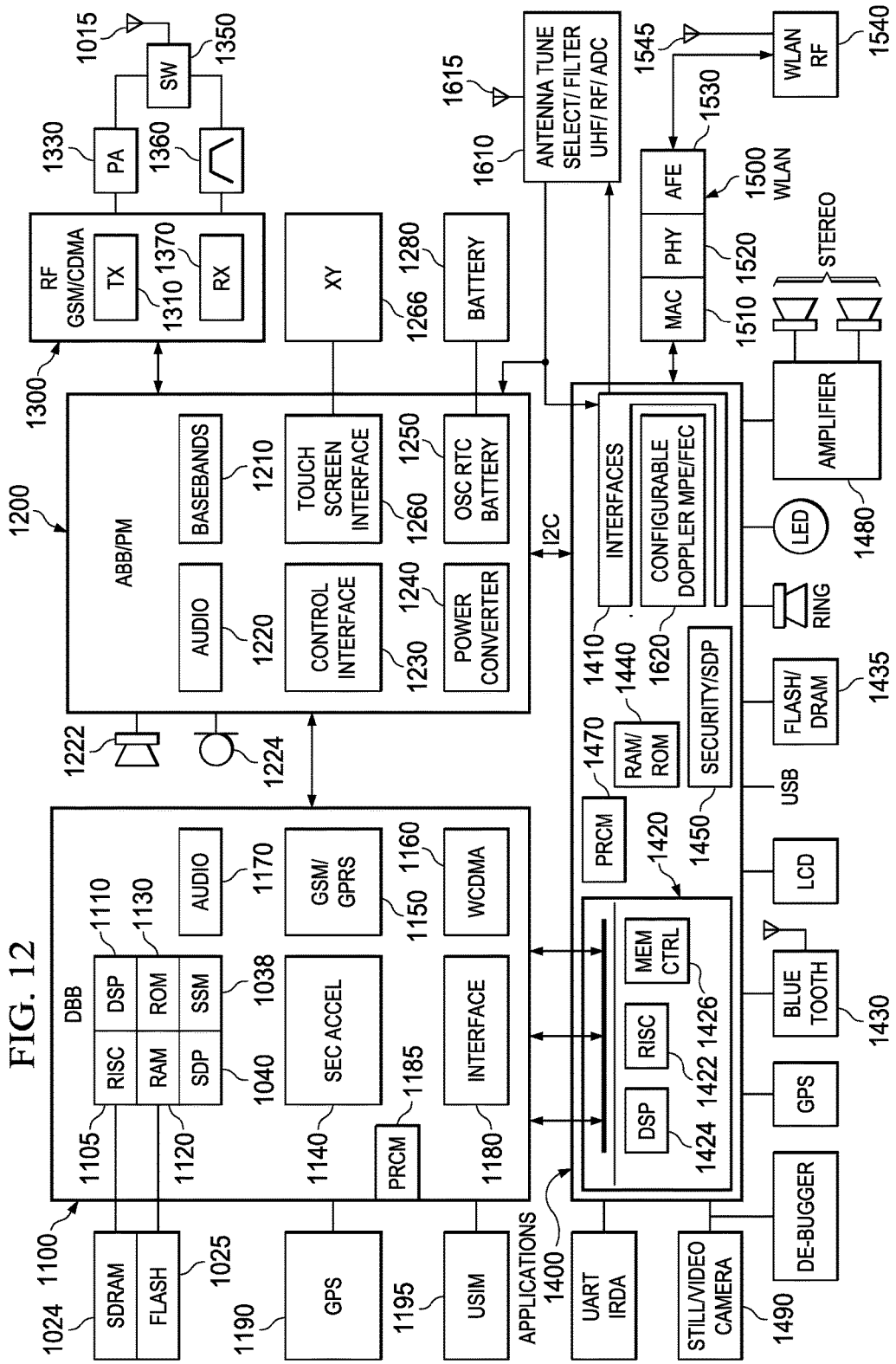

TABLE 1: "BEFORE"

| Actual branch execution | PREDICTION | |
|---|---|---|
| | TAKEN-predicted | NOT-TAKEN-predicted, or not predicted |
| TAKEN (unconditional or conditional-cond-eval-true) | GOOD PREDICTION Do nothing different, i.e. fetch in response to branch predictor | MISPREDICTION Load fetch PC from pipeline with the target address Q0 |
| NOT-TAKEN (conditional-cond-eval-false) | MISPREDICTION Load fetch PC from pipeline with correct value (e.g., P0+ sizeof (cond-goto-instr) | GOOD PREDICTION Do nothing different, i.e. fetch in response to branch predictor |

FIG. 13

TABLE 2: "AFTER"

| | | PREDICTION | |
|---|---|---|---|
| | | TAKEN-predicted | NOT-TAKEN-predicted, or not predicted |
| Actual branch execution | TAKEN (unconditional or conditional-cond-eval-true) | IF qualifier set THEN force mispredict active, Load fetch PC from pipeline with taken target address Q0, ELSE Good prediction Do nothing different | |
| | NOT-TAKEN (conditional-cond-eval-false) | | |

FIG. 14

TABLE 5: QUALIFIER OF CONDITIONAL BRANCH INSTRUCTION

|  |  | PREDICTION | |
| --- | --- | --- | --- |
|  |  | TAKEN-predicted | NOT-TAKEN-predicted, or not predicted |
| Actual branch execution | TAKEN (unconditional or conditional-cond-eval-true) | IF qualifier set THEN Force Mispredict active, Load fetch PC from pipeline with taken target address Q0, ELSE Good prediction Do nothing different | |
|  | NOT-TAKEN (conditional-cond-eval-false) | | IF force Mispredict active qualifier set THEN Load fetch PC from pipeline with P0+sizeof(cond-goto-instr) ELSE Do nothing different |

FIG. 16

CIRCUIT, SYSTEM, AND METHOD FOR DETERMINING WHETHER A BRANCH INSTRUCTION IS PREDICTED BASED ON A CAPTURE RANGE OF A SECOND INSTRUCTION

CROSS-REFERENCE TO RELATED APPLICATIONS

This application: is a divisional of U.S. patent application Ser. No. 12/236,674, filed Sep. 24, 2008.

This application is related to provisional U.S. Patent Application No. 60/981,896, filed Oct. 23, 2007, titled "QUALIFICATION TO A BRANCH INSTRUCTION FOR A PROCESSOR WITH BRANCH PREDICTION, TO CANCEL BAD SIDE-EFFECT OF BRANCH PREDICTION, AND CIRCUITS, SYSTEMS AND PROCESSES OF MANUFACTURE AND OPERATION," and priority under 35 U.S.C. 119(e)(1) is hereby claimed for said provisional U.S. Patent Application.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

This invention relates to the fields of electronic computing hardware and software and communications, and is more specifically directed to improved circuits, devices, and systems for information and communication processing, and processes of operating and making them. Branch prediction can improve performance of branch instructions in a high-performance processor system. Branch prediction improves the efficiency and effectiveness of the instruction fetch process and confers an acceleration to running code without additional software cost. Running code is accelerated by keeping a pipeline full in a microprocessor that has a pipeline. Also, acceleration is facilitated by buffering and hiding all or part of instruction fetch latency (cache and other memory access cycles consumed by instruction fetch) by parallelizing instruction fetch of later instructions with decode and execute operations for earlier instructions in the flow.

In some specific use cases, branch prediction has undesirable side-effects. Sometimes, branch prediction can do harm at a point a branch instruction is branch-predicted when the user program is running. It is desirable in the art to provide ways of avoiding problems with branch prediction.

SUMMARY OF THE INVENTION

Generally and in one form of the invention, an electronic processor is provided for use with a memory having selectable memory areas. The processor includes a memory area selection circuit operable to select one of the selectable memory areas at a time, and an instruction fetch circuit operable to fetch a target instruction at an address from the selected one of the selectable memory areas. The processor includes an execution circuit coupled to execute instructions from the instruction fetch circuit and operable to execute a first instruction for changing the selection by the memory area selection circuit from a first one of the selectable memory areas to a second one of the selectable memory areas, the execution circuit further operable to execute a branch instruction that points to a target instruction, access to the target instruction depending on actual change of selection to the second one of the memory areas; and the processor includes a logic circuit operable to ensure fetch of the target instruction in response to the branch instruction after actual change of selection.

Generally and in a method form of the invention, a method is provided for controlling an electronic processor and a memory having selectable memory areas. The method includes executing a first instruction for changing the selection from a first one of the memory areas to a second one of the memory areas, executing a branch instruction that points to a target instruction in the second one of the memory areas, access to the target instruction depending on actual change of selection to the second one of the memory areas, and ensuring fetch of the target instruction in response to the branch instruction after actual change of selection.

Generally, a process of operation form of the invention involves a process for avoiding a dependency between a branch instruction having a branch target instruction that is correctly fetchable provided execution of another instruction is effectuated, the process including overriding branch prediction for the branch instruction in response to a qualifier associated with the branch instruction.

Generally, another form of the invention involves an electronic circuit including a memory having selectable memory areas, a memory area selection circuit operable to select one of the selectable memory areas at a time, an instruction fetch circuit operable to fetch a target instruction from the selected one of the selectable memory areas, an instruction decoder operable to decode a branch instruction having a branch instruction qualifier, the branch instruction pointing to the target instruction, and a circuit coupled to the instruction decoder and responsive to the branch instruction qualifier to ensure that a selection of memory area is actually changed prior to the fetch of the target instruction.

Generally, still another form of the invention involves an electronic system including wireless transmitting and receiving circuitry, a user interface, a memory having selectable memory areas, and an electronic processor coupled to said wireless circuitry, said user interface, and said memory, and including a memory area selection circuit operable to select one of the selectable memory areas at a time, an instruction fetch circuit operable to fetch a target instruction at an address from the selected one of the selectable memory areas, an execution circuit coupled to execute instructions from said instruction fetch circuit and operable to execute a first instruction for changing the selection by said memory area selection circuit from a first one of the selectable memory areas to a second one of the selectable memory areas, said execution circuit further operable to execute a branch instruction that points to a target instruction, access to the target instruction depending on actual change of selection to the second one of the memory areas, and a logic circuit operable to ensure fetch of the target instruction in response to the branch instruction after actual change of selection.

Generally, yet another form of the invention involves a process of manufacturing an electronic processor for use with a memory having selectable memory areas, the process of manufacturing including fabricating an integrated circuit wafer having established therein a memory area selection circuit operable to select one of the selectable memory areas at a time, an instruction fetch circuit operable to fetch a target instruction at an address from the selected one of the selectable memory areas, an execution circuit coupled to execute instructions from said instruction fetch circuit and operable to execute a first instruction for changing the selection by said memory area selection circuit from a first one of the selectable memory areas to a second one of the selectable memory areas, said execution circuit further operable to execute a branch instruction that points to a target instruction, access to the target instruction depending on actual change of selection to the second one of the memory areas, and a logic circuit operable to ensure fetch of the target instruction in response to the branch instruction after actual change of selection.

These and other circuit, device, system, apparatus, process, and other forms of the invention are disclosed and claimed.

BRIEF DESCRIPTION OF THE DRAWINGS

FIG. 2 is a block diagram of an inventive processor having branch prediction and an inventive branch instruction qualifier decoder, and wherein branch instructions have an inventive branch instruction qualifier for decoding by the inventive branch instruction qualifier decoder.

FIG. 12 is a block diagram of inventive integrated circuit chips for use in the blocks of the communications system of FIG. 1, including a partitioning of circuit blocks of a cellular telephone handset, any one, some or all of the foregoing improved according to the invention.

FIG. 13 is a table of a first set of branch prediction operations according to some examples.

FIG. 14 is a table of a second set of branch prediction operations according to some examples.

FIG. 16 is a table of a third set of branch prediction operations according to some examples.

Corresponding numerals in different figures indicate corresponding parts except where the context indicates otherwise.

DETAILED DESCRIPTION OF EMBODIMENTS

Figure 1A:
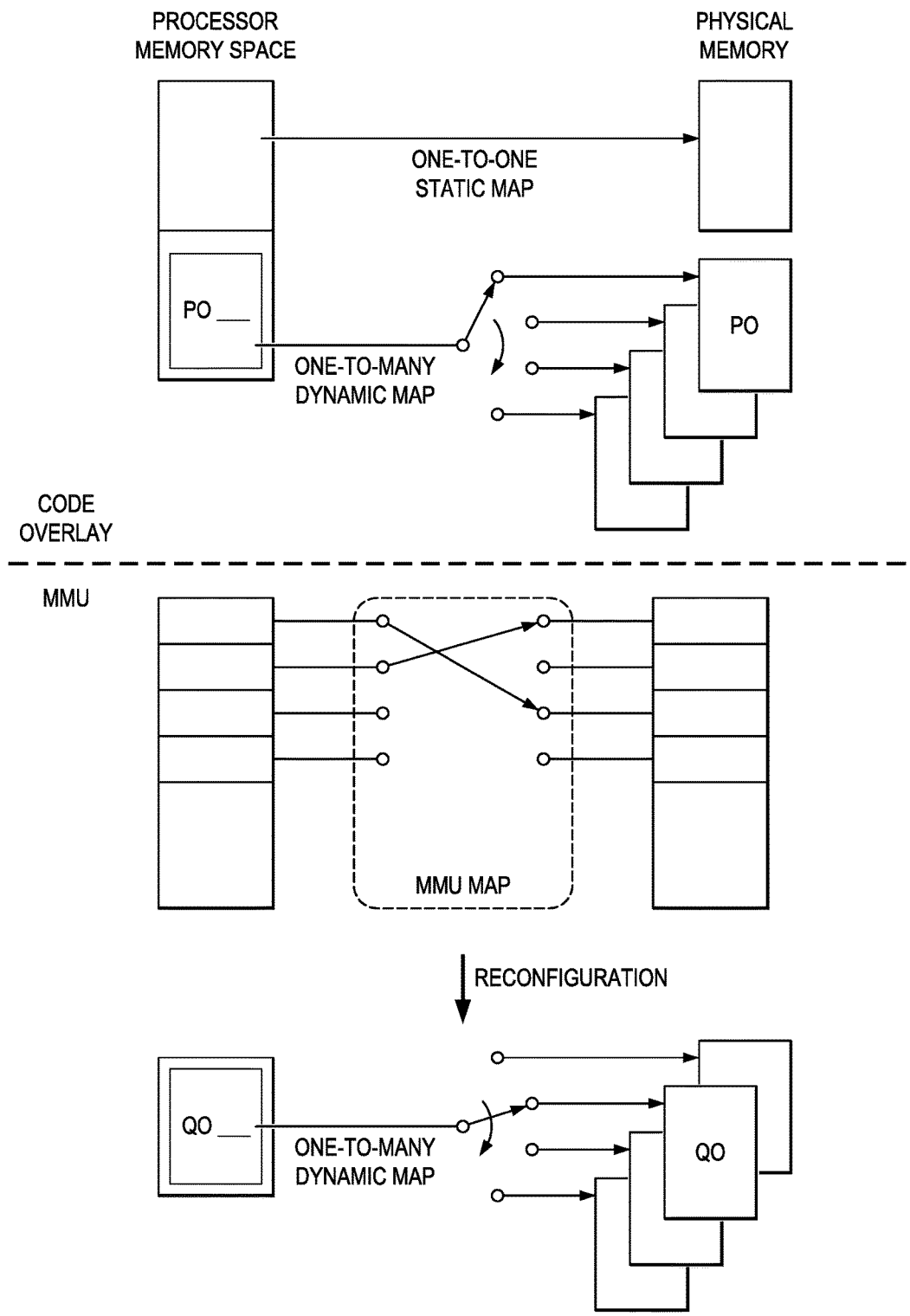
FIG. 1A is a block diagram of a system with memory overlay and illustrating reconfiguration of the system by showing a configuration at top before reconfiguration and a configuration at bottom after reconfiguration and an arrow indicating reconfiguration between the top and bottom parts of FIG. 1A.

A branch prediction issue can occur in a processor system built around a pipelined processor with branch prediction and when that system has a memory overlay feature. Overlay is a capability to bind one logical address to multiple physical memory elements or memory contents, see FIG. 1A. In this way, the processing and processor can access a larger memory space than would be accessible when using its native instructions unaided by the memory overlay feature. Bank switching and memory address translation are forms of memory overlay. An analogous implementation in FIG. 1A downloads a block of code to a memory region, such as by a DMA transfer from an external source containing multiple blocks of code.

Some embodiments handle specific use case issues that concern overlay specifically in program space. A program code pipeline hazard, also called a dependency, is encountered when overlay is utilized. For example, in FIG. 1B, a program code sequence may manipulate the overlay first (reconfigure the memory space) and then execute a branch instruction to branch to that overlaid area for some routine. At the moment that branch instruction is executed and its target address is issued for program fetch at the processor CPU boundary, a prior instruction (e.g., Store ST) that reconfigures the memory space may still be not effective due to the processor pipelining. For the system to operate correctly, the branch instruction should not take effect any earlier than the memory space being actually reconfigured by executing or effectuating the prior instruction that reconfigures the memory space.

Some embodiments herein facilitate a workaround process using a new qualified branch instruction so that the workaround process is easy and straightforward. Some embodiments provide a way to specify or identify the branch instruction that has an undesirable side-effect or hazard. The programmer specifies or identifies a hazard-prone instruction herein by associating a bit-field called a qualifier with one or more such hazard-prone instructions. Branch instructions are described as examples of such hazard-prone instructions when they occur near memory reconfiguration instructions, for instance. The programmer sets the qualifier active for each hazard-prone branch instruction in the program listing. The processor CPU is arranged to respond to each branch instruction that has its qualifier active to identify that branch instruction and dynamically force a mis-prediction to override the branch prediction. Alternatively, the CPU is arranged to respond to the active qualifier to turn off or de-activate the branch predictor or branch prediction process for purposes of that branch instruction only. Either way, the hazard is not activated, caused or permitted to produce an undesirable effect.

Alternatively or additionally, hardware is provided in some embodiments so that the CPU automatically is able to identify a branch instruction regardless of whether the qualifier is present in the program listing or regardless of whether the qualifier is active if the qualifier is present. The hardware in those embodiments automatically qualifies the hazard-prone branch instruction according to a rule and dynamically forces a mis-prediction to override the branch prediction or dynamically turns off or de-activates the branch predictor or branch prediction process for purposes of that instruction only. Then the hazard is not activated, caused or permitted to produce an undesirable effect.

In some processor-based applications, program space is thus not static, meaning that different contexts can be accessed at one program address. As illustrated in FIG. 1A, such overlaid memory space is provided for several reasons with several methods such as 1) to have access to an entire program that is larger than a given limited program space, using a small embedded switch-like mechanism sometimes referred to as overlay, and 2) to isolate an active process in a memory regardless of the memory capacity so as to isolate the active process from all other inactive co-existing processes, and making the system robust with specific MMU (memory management unit) hardware, such as used by modern OSes (operating systems) and systems with virtual machine contexts (VMCs).

The program space reconfiguration is done by program code. Reconfiguration is suitably done by a store-data-to-memory (or store-data-to-I/O) instruction ST of the processor, which accesses a mechanism in the system such as a switch or MMU. A branch (or a call) instruction that was fetched from an address P0 prior to reconfiguration suitably follows in the code and should be executed in the pipeline and after reconfiguration, target a routine in the newly reconfigured region starting at a branch target address Q0. However, this can be problematic from a pipeline operation viewpoint.

At the time of reconfiguration, the processor core hardware should not issue a program request to the reconfigured region earlier than the store request that performs the reconfiguration. If plural store requests are used to perform the reconfiguration, then at the time of reconfiguration, the processor core hardware suitably does not issue a program instruction access request to the reconfigured region earlier than the last or latest-executed one such store request that performs and completes the reconfiguration of the program memory space. Otherwise, the program request would be processed in the memory subsystem based on the old, yet-to-be-altered configuration. Processing using the old configuration would result in an incorrect instruction fetch to the processor, and then the system might be corrupted. Instead, the program request should be issued sometime later than the reconfiguration store request. Unfortunately, the minimum interval between the program request and reconfiguration store request represented by the phrase "sometime later" depends on the specific processor hardware and the specific memory subsystem implementation.

Figure 1B:
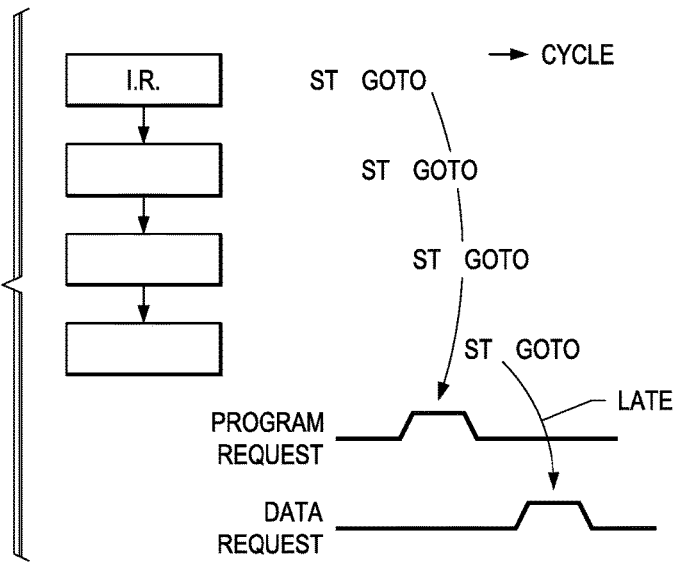
FIG. 1B is a diagram of instructions proceeding through a processor pipeline in the system of FIG. 1A wherein a pipeline hazard arises when a branch instruction "goto" is near a store ST instruction that is involved in the reconfiguration of FIG. 1A.

An example is illustrated in FIG. 1B of a sequence of instructions that could produce or encounter a pipeline hazard in some processors. The instructions (in pseudocode) might include, for instance, an overlay reconfiguration line *hw_switch=#2; turn the dynamic map switch of FIG. 1A; followed by a branch instruction line goto top_of_window or goto some address Q0 in the new window or layer of the overlaid memory. The sequence includes a store instruction ST for reconfiguring memory space and a branch instruction (e.g., goto) for targeting or accessing an instruction situated in a memory space that is actually yet-to-be-reconfigured for fetch as targeted by the branch. The store instruction ST for reconfiguring memory space and the branch instruction (e.g., goto) are back-to-back or sufficiently near or close together in the program code, so that when they are executed by the pipelined processor, a fetch access ("program request" in FIG. 1B) to the branch target address is issued or performed earlier than the store instruction ST that drives a store request for reconfiguration ("data request"). Thus, the fetch access to the branch target address fails to desirably issue later than the store for reconfiguration of the memory space relative to which the fetch access should be effective.

This failure is one example of pipeline hazard and is a drawback or side effect involved in introducing a pipeline into a processor architecture in which operations of different instructions or micro-operations of a given one instruction might end up in an unexpected or undesired result. The pipeline hazard is worked around by sufficiently and dynamically setting apart and displacing those two operations or micro-operations. A possible resolution of the pipeline hazard utilizes instruction scheduling software that arranges the program itself and sets apart interfering instructions in the code. The software resolution inserts NOP instructions in between. The size of gap to establish by sufficient number of NOP instructions between two instructions to be separated is derived from the construction of the execute pipeline as defined for a given processor architecture.

The pipeline hazard thus might be resolved by user programming, by introducing a sufficient delay amount to a trailing instruction to prevent the hazard. The delay is introduced by programming to insert a series of no-operation NOP instructions in between. The behavior of the CPU pipeline may be clearly defined and the amount of delay that needs to be programmed can be determined by user on a given processor or processor core.

However, even with such a programming delay with NOPs, it is possible for the above side-effect of branch prediction to still not be resolved even with NOP insertion. Branch prediction has the processor instruction fetch as its working point. It is quite possible, and indeed may often be the case, that instruction fetch is an automated and implicit process over which user has no control nor even has any visibility. The amount of required delay may be unknowable due to cache miss and cache fetch, or otherwise ultimately remain unknown. Also, even if the required delay is known for one processor, the delay may be different for another processor. This either means that portability of the software between processors suffers, or that architectural options in advanced processor design and upgrade become undesirably constrained.

Figure 1C:
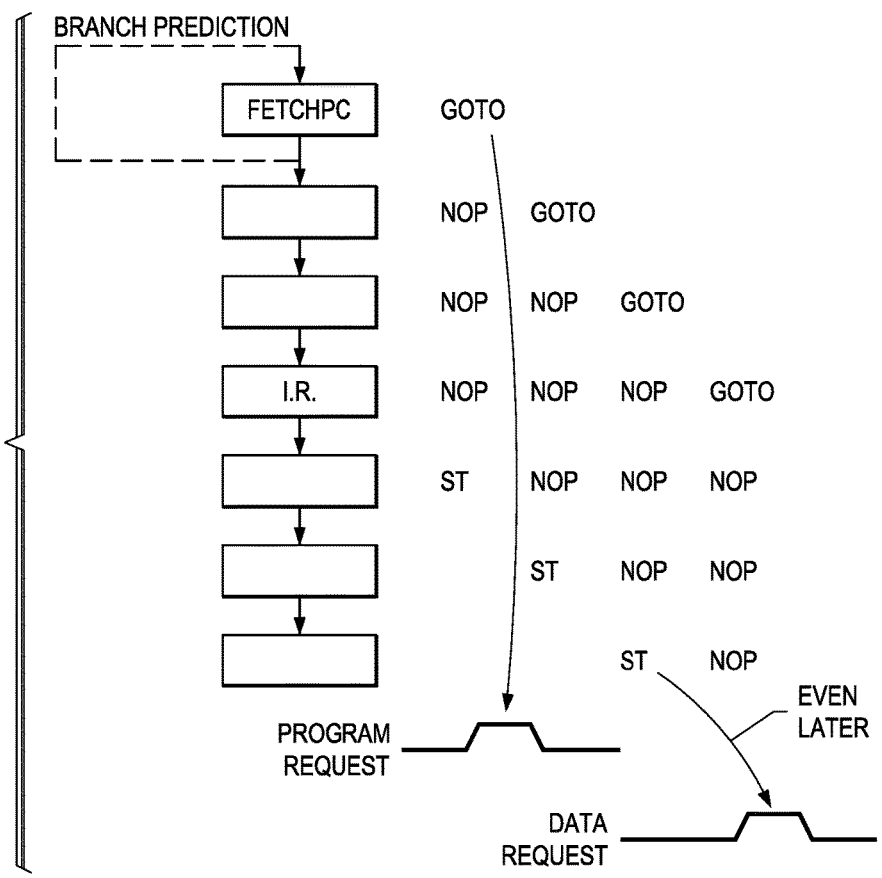
FIG. 1C is a diagram of instructions proceeding through a processor pipeline having branch prediction and fetch in the system of FIG. 1A wherein an exacerbated pipeline hazard arises when a branch instruction "goto" is near a store ST instruction that is involved in the reconfiguration of FIG. 1A.

As shown in FIG. 1C, on a processor with branch prediction, this issue of pipeline hazard becomes exacerbated and worse. In a system with branch prediction, when the branch instruction is fetched to the processor, the branch predictor responds with a branch target address. Using the output of the branch predictor, the processor can fetch contents earlier from memory at the branch target address, but in unreconfigured memory in this case unfortunately. With branch prediction the branch instruction in question may thereby also have the fetch from that address effectively executed speculatively shortly after fetch of the branch instruction itself, and far before actual execution of the branch instruction in the execution pipeline, and much earlier than the store instruction that reconfigures the memory overlay, resulting in undesirably disordered requests at the processor boundary as illustrated in FIG. 1C.

Branch prediction exacerbates this overlay handling issue as shown in FIG. 1C even when NOPs are used. With branch prediction, the processor issues a request to fetch an instruction located at a branch-predicted branch target address some time earlier than the branch instruction executes to actually branch to that branch target address. This can produce a pipeline hazard because the fetched target instruction at the branch target address would be the wrong instruction, i.e. not the intended instruction that is to be fetched that would be found in a reconfigured memory space.

Some embodiments recognize that the user can know with certainty where in the program code the memory space is reconfigured and that a branch is taken to that reconfigured area. Such embodiments provide a direct method and structure for turning off branch prediction on a specific single instance of a given branch instruction, such as in program code wherein memory space reconfiguration is being called-for nearby in the code listing to the branch instruction, using a solution by software strategy facilitated by the structure of such embodiments.

For example, some such embodiments are suitably implemented with a specific instruction or qualifier which works to qualify a branch instruction telling CPU and/or branch predictor either not to operate or to operate differently in case of the qualified instruction as compared with the operation in case of an unqualified instruction, or as compared with qualifier inactive. By clearly defining that this type of hazard is resolved by software, hardware of these embodiments can be remarkably economical of integrated circuit chip real estate. Direct qualification to a specific branch instruction in these embodiments makes user code more readable, portable and universal, supports more robust process architecture design and upgrade, and facilitates program maintenance, as a direct qualification herein is independent of hardware-implementation-specific characteristics of some processor logic.

Regarding the hardware real estate cost of implementing this method to qualify a branch so as to be controllably not-branch-predicted, an example embodiment has only one extra register bit and some additional logic that can be real-estate economical in terms of logic gates added, such as tens of logic gates added in some of the embodiments.

Some process embodiments of operating the hardware of some hardware embodiments suitably respond to each hazard-prone branch instruction to identify that branch instruction and dynamically force a mis-prediction to override, turn off, or de-activate the branch prediction. One type of process responds to each hazard-prone branch instruction that has its qualifier active. Another type of process responds to each hazard-prone branch instruction automatically and sets a qualifier active. The process of operation responds to the active qualifier to override, turn off or de-activate the branch predictor or branch prediction process for purposes of that hazard-prone branch instruction. Either way, the hazard is not activated, caused or permitted to produce an undesirable effect.

Another process embodiment is a process that overcomes a silicon bug by using the qualified branch instruction qualified to controllably, override, turn off or de-activate the branch predictor. Such a software workaround process embodiment is provided in case the processor and/or the branch predictor have some silicon bug on some specific branch instruction. A memory overlay issue or associated reconfiguration store instruction may not be involved at all. The prediction system works normally except at that specific branch instruction because of the bug. The software workaround process embodiment turns off or overrides the branch prediction system dynamically to keep the silicon bug from firing, occurring, or from doing harm.

A qualifier is a specific class of instructions or instruction fields defined on the core machine language. A qualifier is not used alone, i.e., not used in isolation. The qualifier is attached or connected to another instruction, and in some embodiments the qualifier is provided as a bit field in the opcode of the instruction which it qualifies. The qualifier then usefully affects the micro-operation of the instruction to which the qualifier is attached. In some embodiments, a qualifying instruction is provided as an opcode that precedes or succeeds the hazard-prone branch instruction in question and is so closely associated with the hazard-prone branch instruction in the embodiment that the qualifying instruction is also a qualifier for purposes herein.

An example of a qualifier is a saturation qualifier applied to an addition instruction so that together the instruction with qualifier has the form AC0=AC0+#1||sat( ). The symbol AC0 stands for an accumulator. The symbols "+#1" mean addition of an immediate value of one (unity, 1). The vertical parallel bars "||" symbolize the attachment or association or inclusion of a qualifying bit field in an instruction byte, word or double-word or other instruction opcode length. The symbols "sat( )" refer to a particular qualifier as discussed further.

FIG. 2 shows the qualifier sat( ) applied by an arrow 2125 directed to an execution pipeline for math-ops. Suppose the addition instruction is used to add the number one to accumulator AC0 in the example, and accumulator AC0 happens to hold 0x7fffffff (maximum positive hexadecimal value also called the saturation value). Then with saturation qualifier sat( ) active, accumulator AC0 is not allowed to exceed the saturation value and so is updated to that same maximum positive value 0x7fffffff after an addition and saturation. Without the sat( ) qualifier or without sat( ) qualifier active, a plain addition is executed, giving a value 0x80000000 which can signify a highly negative value for some purposes, such as audio processing. If the digital value is part of a digital audio data stream that is converted to an audible analog output for a user, then the user may discern an undesired audible click or noise unless saturation is used at this point. In other words, if an analog audio waveform steadily increases in voltage, the user experience is more satisfactory based on saturation at the high positive digital value rather than with an abrupt transition from a high positive digital value to a highly negative digital value that would be just an artifact of digital processing. The example thus shows the use of the saturation qualifier in math-ops processing as indicated by arrow 2125 pointing to math-ops in FIG. 2.

Unexpectedly and synergistically, in FIG. 2 some embodiments herein bind this saturation qualifier sat( ) to a hazard-prone instance of a branch instruction, and the saturation qualifier sat( ) is given an additional meaning: to force a misprediction or disable the branch prediction specifically and temporarily for the hazard-prone instance of the branch instruction. When a branch instruction is qualified with sat( ) the execution pipeline executes the branch instruction and updates the fetch PC (fetch program counter) 2520 (FIG. 3A) with the actual branch taken target address Q0 or not-taken address P0+1 pointing to next instruction in some embodiments). This additional meaning or role of qualifier sat( ) is represented by additional arrow 2175 in FIG. 2 directed toward a branch execution pipeline. Regardless of any prediction the branch predictor may contain or deliver for this qualified branch instruction, the logic in FIGS. 2, 3A, 3B and 3C also operates when the branch qualifier is active to omit to update the branch predictor, or operates to omit to branch-report actual branch taken or not-taken to the branch predictor, so that the information about the branch behavior will not be taken into account for prediction, if any, later on by the branch predictor mechanism.

In order to prevent the predicted path to be executed at the target of a branch instruction, a nopredict( ) bit or bit field pertaining to a qualifier is added to an unconditional branch instruction. Even if a prediction has been made for that branch, the program at the target address is fetched when the branch reaches the decode phase in the pipeline as if this branch were not predicted.

The sat( ) qualifier, which one would expect to be used to qualify a data unit math-ops instruction, is unexpectedly combined with and used in conjunction with one or more branch instructions to force a misprediction and override the branch predictor and provide the branch result from actual execution to the fetch PC. For example, to qualify a goto instruction, the syntax is: goto label||nopredict( ) or goto label||sat( ). Qualifier hardware for a math-ops instruction sat( ) qualifier in the instruction decoder is changed to also qualify one or more of the branch instructions as in FIG. 2. (Some other embodiments have separate sat( ) and BPQ( ) qualifiers as described in connection with FIG. 4.)

In FIG. 2, a sat( ) qualifier is thus coupled not only with math-computing instructions but also with one or more branch instructions. The qualifier is suitably used by user activating or inactivating the qualifier and/or providing or not providing the qualifier for each specific branch instruction. If the sat( ) qualifier is provided and/or activated for a specific branch instruction, the processor decode logic responds to the sat( ) qualifier telling the processor that the specific branch instruction in the program code is not to be predicted. In FIGS. 3B and 3C, the processor qualifier logic and execution pipeline operate to cause the target address (taken or not-taken) to be loaded into the fetch PC of FIG. 3A in an assured manner by execution from the execution pipeline and not from prediction, or subsequent to prediction, by the branch prediction mechanism. In this way, the qualified branch instruction guarantees that the CPU exports a program instruction fetch request (say, toward taken target address Q0) delayed by a sufficient time interval and thus enough time later than a data write request ST that reconfigures the program memory space in FIGS. 1A, 1B and 1C to assure that the reconfiguration actually is completed prior to the instruction fetch request. The reconfiguration can be made by any one of several ways, e.g. updating the MMU (memory management unit) or other switching between physical memory spaces, and the sat( ) qualifier embodiment accommodates different types of reconfiguration.

Figure 3A:
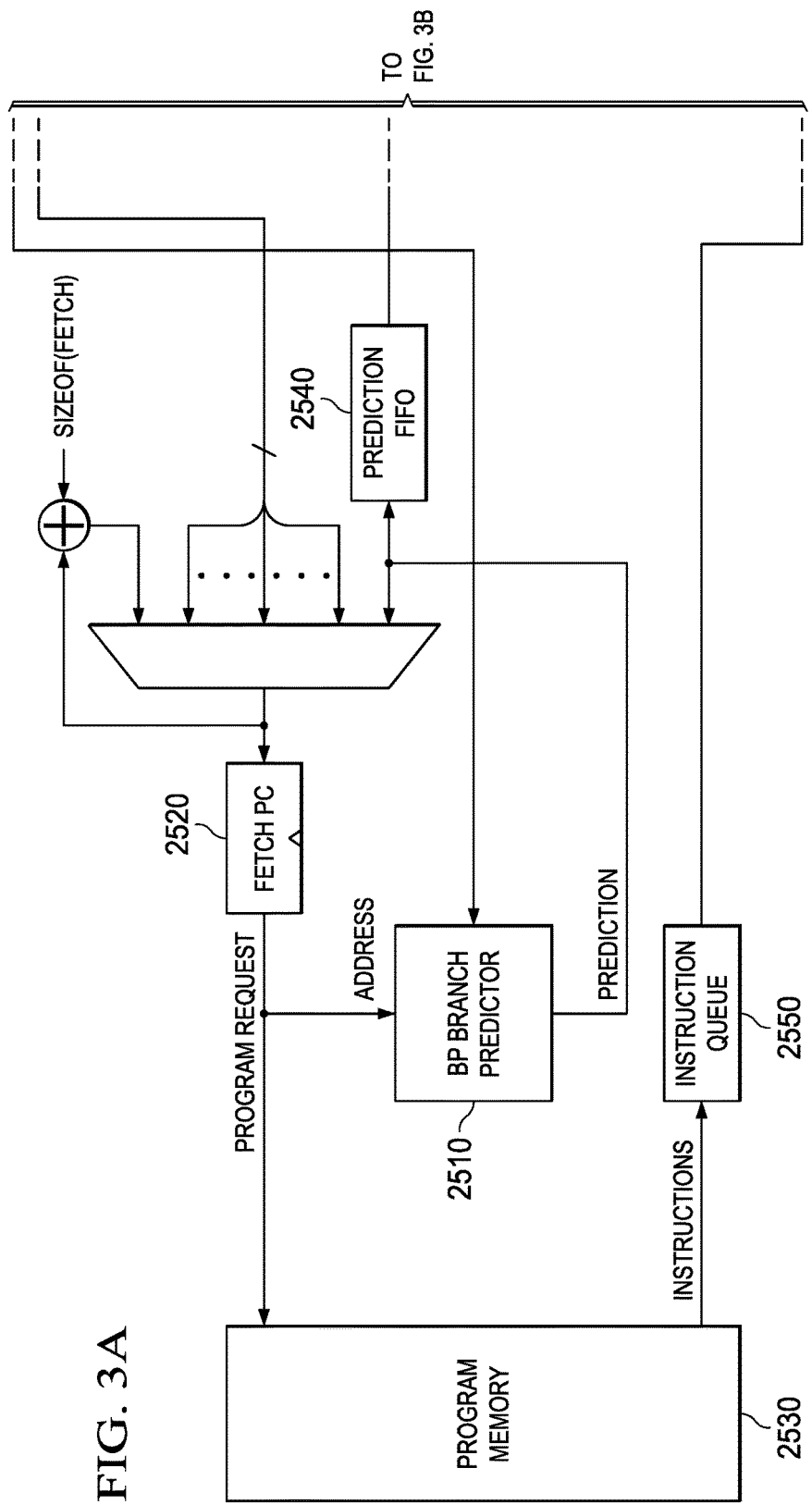
FIGS. 3A and 3B are two parts of a composite block diagram of an inventive processor having branch prediction and an inventive branch instruction qualifier decoder, and wherein inventive branch instructions have an inventive branch instruction qualifier for decoding by the inventive branch instruction qualifier decoder.
Figure 3B:
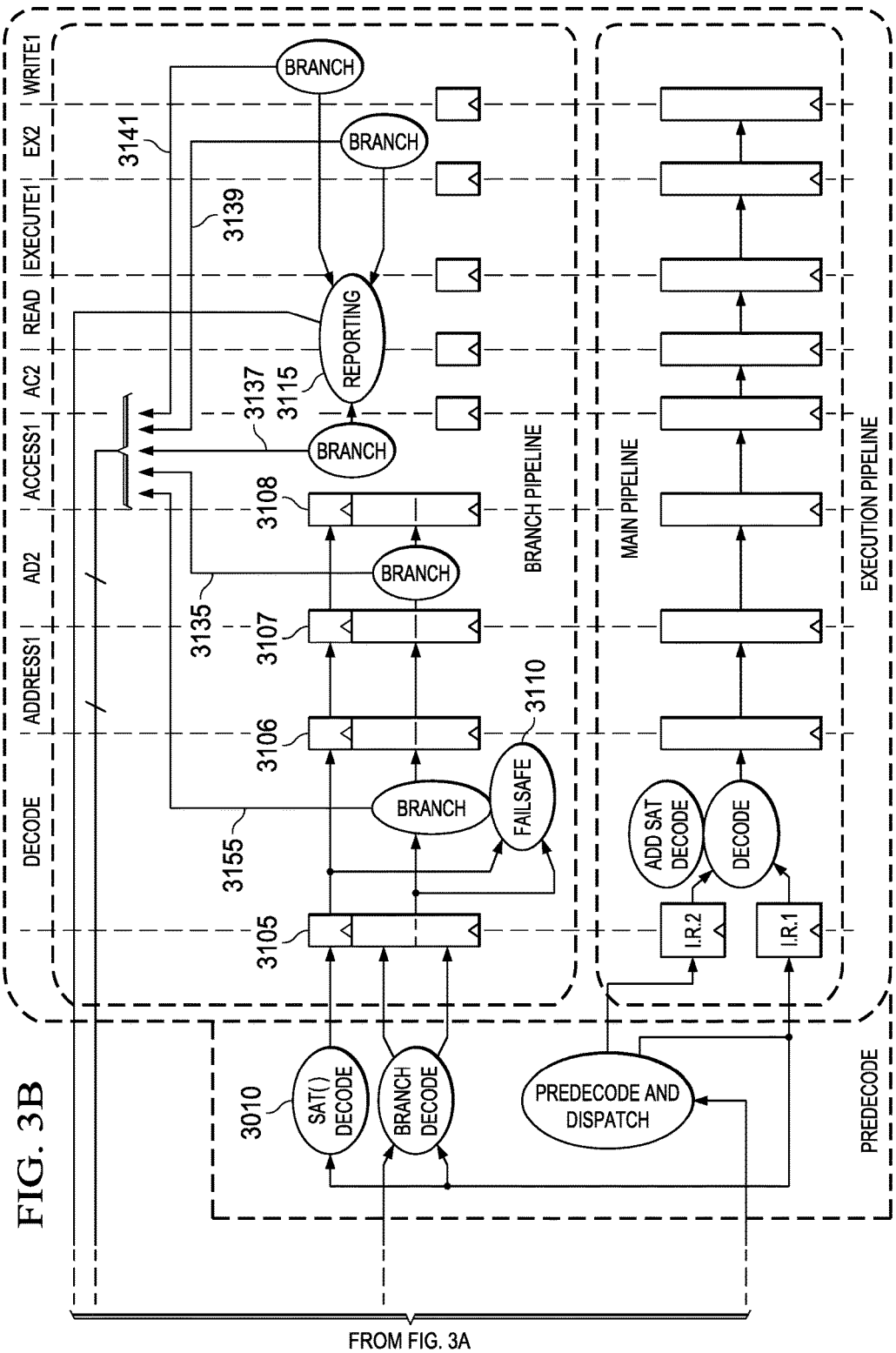
Figure 3C:
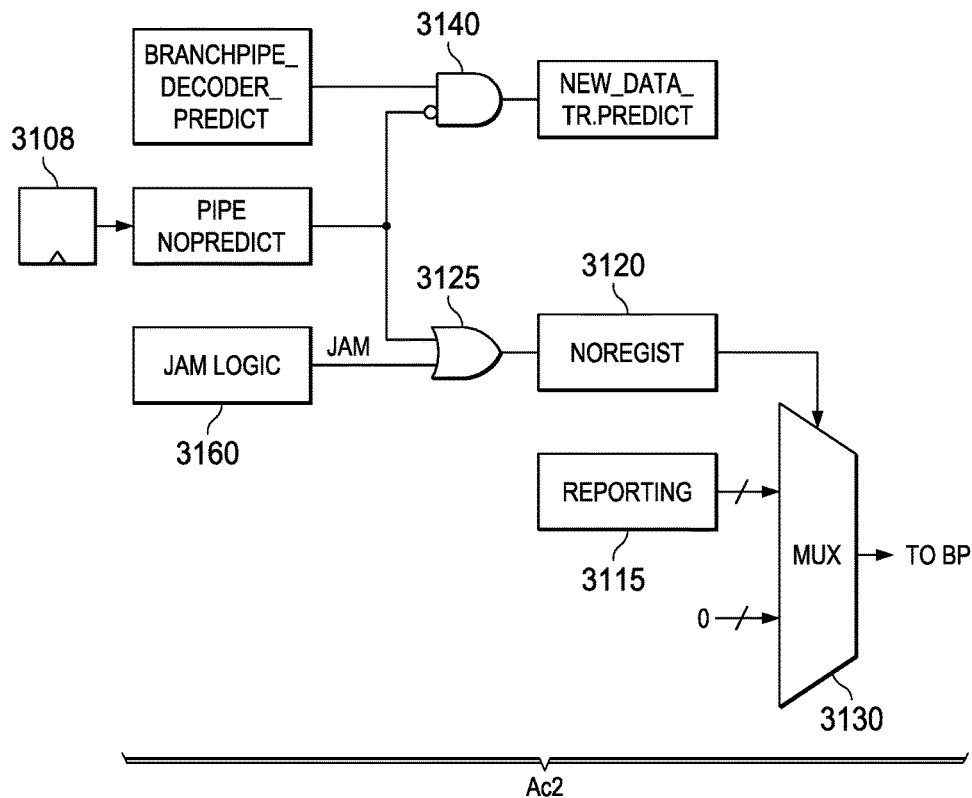
FIG. 3C is a partially-block, partially schematic diagram detailing a part of an inventive pipeline in the inventive processor of FIG. 3B.

FIG. 3A is an illustration of a front-end of a processor with branch prediction by a branch predictor BP 2510. Associated with a processing unit CPU is a fetch PC (program counter) 2520. The fetch PC 2520 in operation holds an address that is itself a memory address or an address that points to a memory address from which CPU fetches instructions. A memory 2530 holds or stores a program (e.g., object code) that can be some application program or some operating system OS program or some other type of program. The branch predictor BP 2510 monitors program fetch access requests by the CPU and signals to the CPU if the program code from the pointed-to address contains a branch instruction. An instruction queue IQ 2550 stores instructions temporarily before dispatch to an execute pipeline of FIG. 3B. The instruction queue IQ 2550 has a branch prediction FIFO 2540 aside it or associated with it. The branch prediction FIFO 2540 stores information on predicted branch instructions that are in the instruction queue IQ 2550. The capacity of this instruction queue IQ 2550 varies and can have several instructions or just one instruction or none depending on the processor architecture. The execution pipeline starts from one or more instruction registers IR in the embodiment of FIG. 3B (depicted by IR 2570 of FIG. 2) and has a decode section that decodes the instruction then operates accordingly. Various partitionings and definitions of the pipeline or parts thereof are suitably employed for the purposes at hand.

In FIG. 3A, program access requests are issued from the CPU to the memory subsystem 2530, which returns data (meaning for purposes of this sentence a fetched piece of code including one or more instructions) back to the CPU. The CPU stores the fetched instruction(s) fetched as such "data" in instruction queue IQ 2550 and then dispatches each instruction one by one to its execute pipeline(s) of FIG.

3B. The execute pipeline decodes and processes one or more instructions from the instruction queue IQ. Branch instructions can be conditional or unconditional. Some instruction architectures have a call instruction in addition to or as a kind of branch instruction. Call and return instructions are also suitably treated as a branch instruction for purposes of qualifying branch prediction herein. When the execute pipeline processes a branch instruction (conditional or unconditional) and the branch is taken, then a branch pipeline that is a parallel portion of the execute pipeline in FIG. 3B executes the branch and has a reporting circuit 3115 that reports the outcome to which program address (target address Q0) the branch instruction actually branches. A branch instruction might not branch in a given instance, because of being a conditional branch that has a condition that evaluates false or because of the state of some status or other bit field. Actual execution of a branch instruction, from a hardware viewpoint, loads a new value into the fetch PC 2520 and discards speculatively accessed program code that is in the instruction queue IQ 2550 or in fetching if the speculatively accessed program code is useless or has now become useless because of the actual execution of the branch instruction by the branch pipeline.

In FIG. 3A, the branch predictor BP 2510 receives and stores branch Taken/Not-Taken information from Reporting 3115 from actual execution of the branch instruction by the execution pipeline of FIG. 3B. The Taken/Not-Taken information from actual branch execution is stored in a memory circuit inside the branch predictor BP 2510. Assume a branch instruction is placed at address P0 of FIG. 1A and if the branch is taken, then the taken target address of the branch is Q0. FIG. 1A illustrates the target address Q0 of the branch may be situated in a different physical memory space from the physical memory space that contains address P0 of the branch instruction itself. Some time later the CPU again fetches instruction from address P0. At this time the branch predictor may give the CPU a prediction that the branch instruction located at that address P0 will take a branch to target address Q0. The CPU receives this prediction and then loads the predicted-taken target address Q0 into the fetch PC (fetch program counter register 2520) instead of just incrementing the fetch PC to the next address of an instruction beyond address P0 in the memory space containing program code. If the prediction to the CPU from the branch predictor is Not-Taken instead, then the fetch PC is incremented to the next address of an instruction beyond address P0 in the memory space containing the program code.

In FIG. 3A, in case of a predicted-taken branch, in succeeding cycles thereafter the CPU fetches instructions and puts the fetched instructions into instruction queue IQ 2550, with the fetch PC being incremented from and beyond taken-target address Q0. Further branches may occur and are processed in an analogous manner. Concurrently or even some cycles later, the branch instruction at address P0 is dispatched from an issue queue to the execution pipeline accompanied by branch prediction information. The execution pipeline executes or partially executes the branch instruction sufficiently to verify or disconfirm the branch prediction that was given by the branch predictor on that branch instruction. If disconfirmed, an active Mispredict signal is fed back to the branch predictor from the branch pipeline. Also, a Branch Report of the execution of the branch, such as information including the Taken or Not-Taken actual direction and the actual target address to fetch if Taken, are sent back to train the branch predictor and update the BTB/BTAC (Branch Target Buffer/Branch Target Address Cache) in BP 2510.

If the branch prediction is verified correct, the execution pipeline in some architectures might ordinarily not update the fetch PC. Two types of correct predictions are 1) predicted-taken-then-executed-taken, and 2) predicted-non-taken-then-executed-non-taken). See corresponding cells in TABLE 1 of FIG. 13. For this correct prediction, the execution pipeline can report something to the branch predictor, which is especially helpful in case the branch instruction is a conditional type of branch instruction.

Sometimes the branch prediction is found to be incorrect by actual execution of a branch instruction by the execution pipeline. In FIGS. 3A/3B, if the branch prediction for the branch instruction is incorrect, the execution pipeline does update the fetch PC. Two cases of incorrect branch predictions are 1) predicted-non-taken-then-executed-taken, and 2) predicted-taken-then-executed-non-taken. See further cells in TABLE 1 of FIG. 13 corresponding to these two cases of incorrect branch predictions. In case 1) predicted-non-taken-then-executed-taken, the fetch PC is updated with the taken target address Q0. In case 2) predicted-taken-then-executed-non-taken, the fetch PC is updated by incrementing it from address P0 to the next program instruction address. Using the updated fetch PC, the processor discards the result of the incorrect branch prediction, such as a series of improvidently-fetched instructions in the instruction queue IQ 2550, and gets back on track in the program by fetching instructions in conformance with the executed branch result.

Some embodiments support and apply a qualification herein to a branch instruction or particular type of branch instruction, or subset of all the branch instructions in the instruction set architecture (ISA). The qualification is implemented by the addition of a qualifier decoder 3010 having a small amount of logic 3010 as represented in FIGS. 2 and 3B and a small amount of related pipeline logic as represented in FIG. 3C.

The corresponding change in the execution pipeline, in the form of its functionality, is illustrated in Before-After form in TABLE 1 of FIG. 13 and TABLE 2 of FIG. 14 respectively.

"After" TABLE 2 of FIG. 14 shows changes and improvements using branch prediction qualification, with differences highlighted. A blank TABLE 2 cell entry means the entry is same as and unchanged from TABLE 1 of FIG. 13. In other words, the cell for TAKEN-predicted and Taken Actual is changed in TABLE 2 compared to TABLE 1. Put another way, TABLES 1 and 2 are same for the column for NOT-TAKEN-predicted, and the TABLES 1 and 2 are the same for the row for NOT-TAKEN-actual, i.e., actual branch prediction.

Because of the variety of branch instructions that may be supported by a digital signal processor (DSP), or a RISC processor, or other processor in some embodiments, decoding circuitry 3010 for this qualifier is applicable for any of the branch instructions to which the qualifier is applied in the collection of branch instructions found in the ISA (instruction set architecture). Remarkably, the decoding circuitry 3010 is desirably reused for all the applicable branch instructions so that the qualification of all the applicable branch instructions utilizes a small number of logic gates in the hardware herein.

Similar economy applies to a logic block 3115 of some embodiments, which block 3115 produces reports to the branch predictor 2510. The entire logic there is enabled by hardware corresponding to a hardware design code representation IF-(Not_Qualified)-THEN inserted into hardware design code, according to some such embodiments with qualified branch prediction. In this way, the branch predictor 2510 is not updated with and does not incorrectly get trained on forced Mispredictions from TABLE 2 (or TABLE 5) that are provided to overcome a pipeline hazard instead.

FIGS. 3A, 3B and 3C illustrate a detailed implementation of a processor embodiment with qualified branch prediction. A box with a tick (clock input A) means a register (or registers) in or between pipeline stages.

Instructions are dispatched from instruction queue 2550 to the execution pipeline through predecode-and-dispatch control logic. A micro-operation of the logic extracts one or two instructions out of an instruction stream that has been fetched and stored in the instruction queue 2550.

One example of a CPU core supports instruction dual-issue. An instruction format accommodating instruction dual-issue is given next:

Bare instruction:
AC0=AC0+*AR2; add memory (pointed to by AR2) content to accumulator AC0.

Bare instruction with optional constant:
AC0=AC0+#0x40001; add memory (address 0x40001) content to AC0.

Either of above two, qualified with a qualifier:
AC0=AC0+*AR2||sat( ); saturated math operation specified Any of above three, paralleled to form a paired instruction for two accumulators.
(AC0=AC0+*AR2||AC2=AC2+*AR4)

The processor hardware dispatches one or two qualified instruction(s) to the execution pipeline. Paths for two qualified instructions are represented by two outgoing lines in FIG. 3B from instruction registers IR1 and IR2 to decode and execute pipeline stages, and parallel or replicated execute pipelines are suitably used.

The instruction(s) are suitably passed to the execution pipeline in different styles. In a first style, the instruction as stored in the program memory is used unchanged internally as the machine instruction itself. In the second style, the instruction is decoded into an internal expression or machine instruction, where "internal" for this purpose means an implementation-specific electrical form invisible to user for driving the particular implementation of hardware of the processor to perform particular processing that the instruction is coded to represent. The branch decision-making at Decode stage is completed quickly when the branch instructions are partially analyzed, pre-decoded and/or predicted in advance.

In FIG. 3B, one example of an execution pipeline has a main pipeline and a branch pipeline. The main pipeline is a pipeline or set of parallel pipelines through which many, most or all the instructions go. Instructions are decoded and analyzed for various micro-operations like data address generation and data access, and for mathematical computations (details omitted for clarity). The branch pipeline is provided so that branch instructions go through the branch pipeline and may also go through the main pipeline. The branch pipeline is dedicated for processing branch instructions and performs branch pipeline operations, such as by 1) checking a condition for a conditional branch, 2) executing a branch and verifying a Taken/Not-Taken prediction from the branch predictor for a branch against an actually executed branch Taken/Not-Taken result, 3) invalidating speculatively-dispatched instructions when a mis-prediction occasionally occurs, and 4) reporting the executed result of each branch instruction to the branch predictor, and 5) any other appropriate branch pipeline operations to support branch instruction execution.

When a branch instruction, for which a branch prediction of Taken or Not-Taken was made by the branch predictor, is dispatched to the execution pipeline, the branch prediction is also passed along with that dispatched branch instruction or internal expression thereof. The prediction for this purpose includes the predicted branch target address and predicted direction Taken/Not-Taken applicable for conditional branch. The branch pipeline has circuitry that either verifies or disconfirms the branch prediction from the branch predictor based on the actual execution of the branch instruction itself.

Some embodiments with qualified branch prediction are implemented in the following manner and are drawn with the hardware qualifier portion shown contrastingly in FIG. 3B. A qualifier is checked by hardware 3010 to determine if it is saturation qualifier sat( ) used as a branch instruction qualifier (or if it is another branch instruction qualifier BPQ( ) herein) and further whether this qualifier is active. The branch instruction qualifier is checked by hardware 3010 in parallel with branch instruction decode right after the pre-decode logic. If the qualifier is present and active, then a one-bit indication pipe_nopredict is made active, otherwise pipe_nopredict is made inactive. This one-bit indication pipe_nopredict is passed to the branch pipeline, qualifying its corresponding hazard-prone branch instruction.

Some embodiments provide a small amount of logic to implement hardware 3010 to check if a qualifier is sat( ), which is represented by a predetermined bit pattern "bit_pattern" such as a byte or other set of predetermined qualifier-specific code bits.

This logic is represented by hardware design pseudo-code in TABLE 3 as follows:

TABLE 3

HARDWARE DESIGN PSEUDOCODE
FOR QUALIFIER CHECKING

```
PROCESS(qualifier)
BEGIN
    IF (qualifier = "bit_pattern") THEN
        cf_nopredictpd2_tr <= '1';
    ELSE
        cf_nopredictpd2_tr <= '0';
    END IF;
END PROCESS;
```

In FIG. 3B, an example of an embodiment with qualified branch prediction is implemented in an uncomplicated way by 1) adding one-bit register 3105 to hold the one-bit indication pipe_nopredict, between Predecode stage and Decode stage, to capture sat( ) qualification on a branch, and 2) the prediction from branch predictor 2510 of FIG. 3A is thrown away at Decode stage of FIG. 3B, if the register 3105 is set.

In FIG. 3B, another mechanism acting as a failsafe mechanism is embedded in some embodiments and provided in case that the qualified branch is predicted by the branch predictor for some reason. The prediction information is intentionally thrown away at the Decode stage of the pipeline, if the branch instruction qualifier is active (qualified). With this failsafe mechanism 3110, the branch instruction is treated as if it were not predicted, so that the Fetch PC 2520 is updated as a result of execution of that qualified branch instruction in the execution pipeline via lines 3135, 3137, 3139, 3141 and not as a result of operation of the branch predictor 2510 via line 3155. The failsafe mechanism can limit or control the selection made by the mux feeding Fetch PC in FIG. 3A.

The one-bit indication pipe_nopredict that the branch instruction qualifier is active (qualified) is further pipelined from register 3105 via registers 3106, 3107, 3108 as a disabling control bit toward reporting logic 3115 that performs branch pipeline operation (4) of an earlier paragraph hereinabove referring to (4) reporting the executed result of each branch instruction to the branch predictor. In FIGS. 3B and 3C in the reporting logic 3115, if a branch is qualified, then the reporting to the branch predictor is suppressed, disabled or prevented. Accordingly, the branch predictor BP 2510 of FIG. 3A does not learn or train on the behavior of this branch instruction when qualified, and the branch predictor will not use such qualified branch behavior to predict this branch in later execution based on behavior of the branch while the qualifier is or has been active.

In FIG. 3C, instruction jam logic 3160 may be present to prevent reporting a branch to the branch predictor, but provided for a different jam function and time of operation and without overcoming the pipeline hazard of FIGS. 1A-1C. In such case, a register NoRegist 3120 is provided in the branch execution pipeline, and this NoRegist register 3120 is responsive via an OR-gate 3125 not only to the instruction jam logic 3160, but also to the branch instruction qualifier pipe_nopredict from register 3108 for disabling branch prediction and thereby overcoming the pipeline hazard. Register 3120 is named NoRegist herein, meaning do not report to, nor register a branch in, the branch predictor. In embodiments that lack jam logic 3160, then register 3108 is suitably coupled to NoRegist 3120 with or without the OR-gate 3125.

The arrangements of branch prediction qualifier and nopredict indication thus address a pipeline hazard that comes from out-of-order execution or dependency of the micro-operational steps of the data-write and program-read in the pipeline. The branch prediction qualifier and hardware embodiments herein provide pipeline hazard resolution that delays the program-read by disabling or overriding the acceleration resulting from branch prediction, to keep the correct order of pipeline operations.

To support program overlay or MMU updates, the nopredict indication, by being set active in response to the branch instruction qualifier, forces a branch to be not predicted. In FIG. 3C, forcing a branch to be not predicted is accomplished by a Mux 3130 having a selector control input fed from NoRegist 3120. An active qualifier provides an active state of NoRegist 3120 which selects a "0" state or not-predicted state of lines fed by the output of Mux 3130. An inactive state of NoRegist 3130 selects the output lines from Reporting logic 3115 and passes them via Mux 3130 to the branch predictor BP 2510 in FIG. 3A.

In FIG. 3C, a further circuit including an AND-gate 3140 in some embodiments forces a branch to be not predicted. Suppose a high-active enable called branchpipe_decode.predict were provided for enabling circuitry supporting a predicted branch. The AND-gate 3140 is introduced herein and has a first high-active input coupled to the enable branchpipe_decode.predict. The AND-gate 3140 has a second low-active input (indicated by a small input circle) fed by the qualifier indication signal pipe_nopredict. The output of AND-gate 3140 is suitably designated new_datatr.predict and is coupled for enabling the circuitry supporting a predicted branch and that output is high-active (high when active). When qualifier indication signal pipe_nopredict is inactive (e.g., low), then AND-gate 3140 supplies output new_datatr.predict with the same high or low level as the input signal branchpipe_decode.predict currently has at any given time. However, when qualifier indication signal pipe_nopredict is active (e.g., high in FIG. 3C), then the output new_datatr.predict of AND-gate 3140 is forced low regardless of any level the input signal branchpipe_decode.predict might currently have. The output new_datatr.predict being forced low then is suitably used to inactivate or disable the circuitry that would otherwise support a predicted branch. Also, the forced-low output new_datatr.predict is also suitably used as a low-active flush-enable or otherwise routed to suitable circuitry to throw away a predicted branch and its consequences to thereby override branch prediction.

For instance, the active branch qualifier indication signal pipe-nopredict operates via AND-gate 3140 or otherwise to flush an instruction buffer queue IBQ or IQ 2550 or to effectively do the equivalent of a flush of the IBQ when used with an unconditional branch. Support is provided by adding a saturation opcode qualifier to a branch instruction. A syntax example is "||nopredict( )". Note that circuitry of Mux 3130 and/or AND-gate 3140 is respectively provided in any one or more pipeline stages to which Mux 3130 and/or AND-gate 3140 is applicable to effectively implement the branch instruction qualification herein for particular current and future processor architectures.

Figure 4:
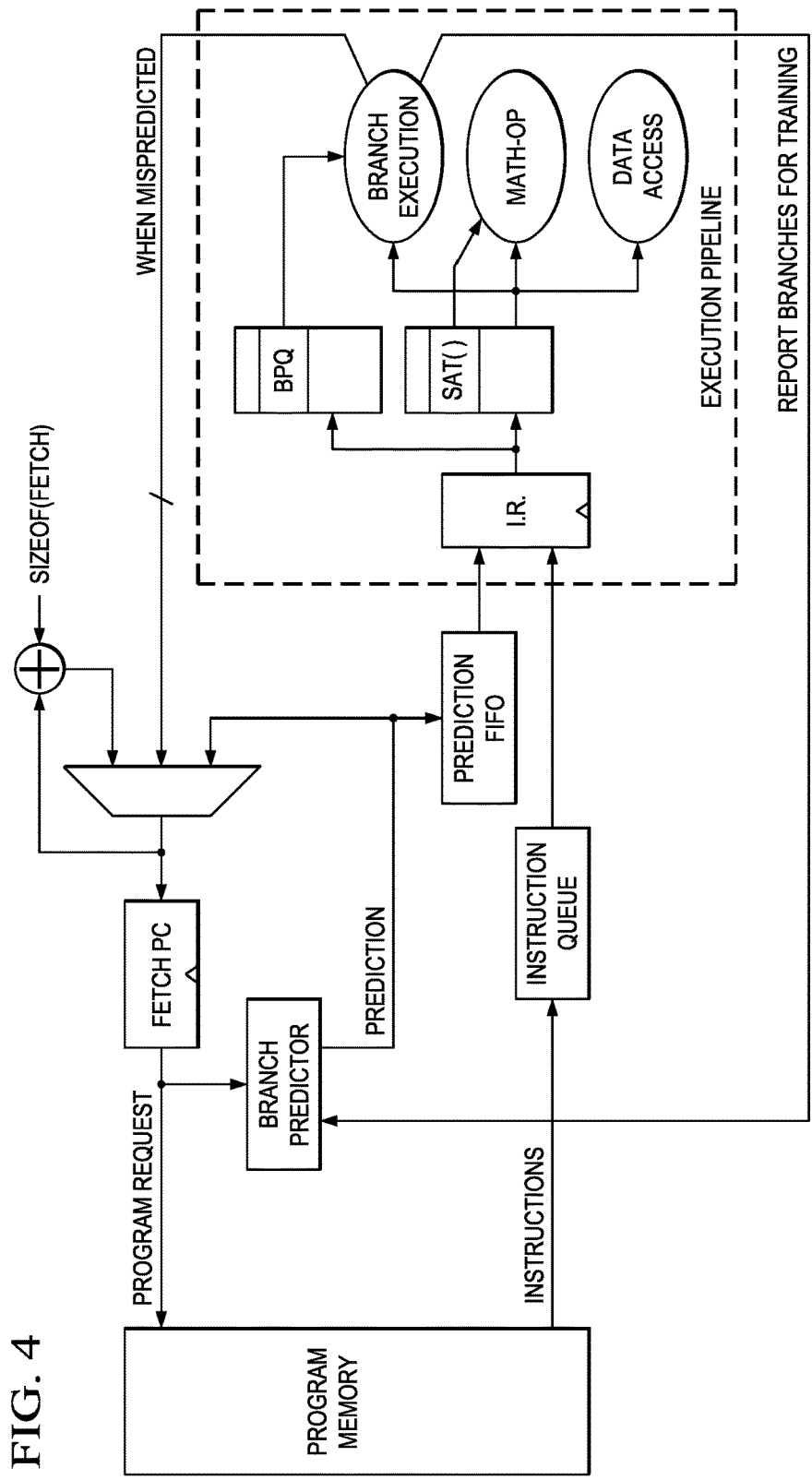
FIG. 4 is a block diagram of another inventive processor having branch prediction and an inventive branch instruction qualifier decoder, and wherein inventive branch instructions have an inventive branch instruction qualifier for decoding by the inventive branch instruction qualifier decoder.

FIG. 4 represents a category of embodiments with separate circuitry for a math-ops saturation qualifier sat( ) and an additional branch prediction qualifier circuitry BPQ( ) In FIG. 4 some embodiments herein bind this saturation qualifier sat( ) to a math-ops instruction and synergistically bind one or more analogous but distinctly opcoded qualifier(s) BPQ( ) to one or more branch instructions. The branch prediction qualifier BPQ is given a meaning to disable the branch prediction specifically and temporarily for a hazard-prone branch instruction. When a branch is qualified with BPQ( ) the execution pipeline executes the branch instruction and updates the fetch PC (fetch program counter) with the actual branch taken target address Q0 or not-taken address P0+1 (next instruction). This meaning or role of qualifier BPQ( ) is represented by a decoder output line in FIG. 4 directed from branch prediction qualification circuitry for BPQ( ) to the branch execution pipeline. Regardless of any prediction the branch predictor may contain for this qualified branch instruction, the operation of the BPQ( ) logic in FIG. 4 when the branch qualifier BPQ( ) is active is to omit to update the branch predictor, or omit to report actual branch taken or not-taken to the branch predictor, so that the information about the branch behavior will not be taken into account for prediction, if any, later on by the branch predictor BP 2510.

In order to prevent the predicted path to be executed at the target of a branch instruction, the nopredict( ) qualifier BPQ( ) is added to an unconditional branch instruction. Even if a prediction has been done for that branch, the program at the target address is fetched when the branch reaches the decode phase in the pipeline as this branch was not predicted free of the pipeline hazard and so the results of actual branch execution are used instead.

The BPQ( ) qualifier is remarkably combined with and used in conjunction with one or more branch instructions to force a misprediction. For example, to qualify a goto instruction, the syntax is: goto label||nopredict( ) or goto label||BPQ( ). BPQ( ) qualifier hardware for the branch prediction qualifier is separately provided in the instruction decoder to also qualify one or more of the branch instructions as in FIG. 4.

In FIG. 4, the qualifier BPQ( ) is suitably used by user activating or inactivating the qualifier BPQ( ) for each specific branch instruction. If the qualifier is activated for a specific branch instruction, the processor decode logic responds to the qualifier telling the processor that the specific branch instruction in the program code is not to be predicted. In FIGS. 3B and 3C, the processor qualifier logic and execution pipeline operate to cause the target address (taken or not-taken) to be loaded into the fetch PC of FIG. 3A in an assured manner by execution from the execution pipeline and not from prediction by the branch prediction mechanism. In this way, the qualified branch instruction guarantees that the CPU exports some program request (say, toward taken target address Q0) enough time later than a data write request that reconfigures the program memory space in FIG. 1A. The reconfiguration can be made by any one of several ways, e.g. updating the MMU (memory management unit) or other switching between physical memory spaces.

Figure 5A:
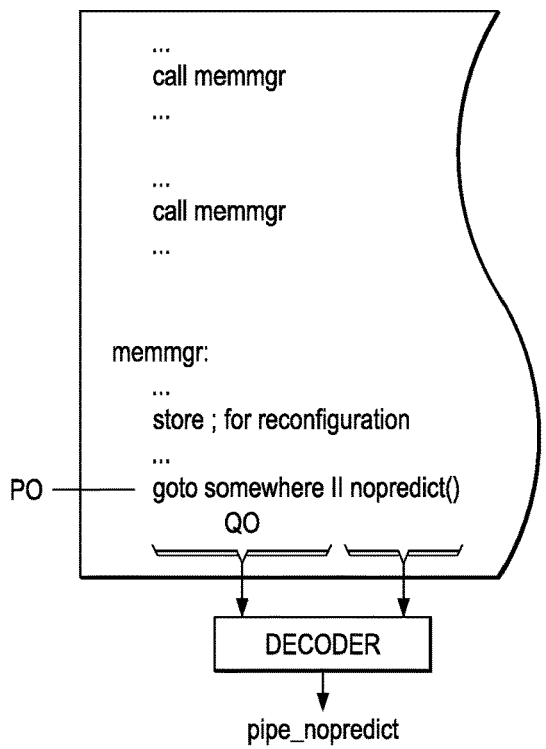
FIG. 5A is a block diagram of a further inventive branch instruction qualifier decoder, and wherein inventive branch instructions have an inventive branch instruction qualifier for decoding by the inventive branch instruction qualifier decoder.

In FIG. 5A, a program listing of an entire application or of an operating system has a qualified unconditional branch instruction "goto Q0∥nopredict( )". This qualified unconditional branch instruction is located at memory address P0. Some embodiments decode the opcode fields of this qualified unconditional branch instruction by identifying that the unconditional branch instruction "go to Q0" is present in conjunction with decoding a qualifier field "nopredict( )" to identify that the branch qualifier is present. Decoder circuitry thus determines by identifying the branch instruction and identifying the qualifier which branch is not to be predicted, and then outputs an active one-bit indication pipe_nopredict.

Notice also that in some embodiments of processors that use multiple pipelines and multiple instruction registers IR1, IR2, etc., the branch pipeline may be replicated and the one bit indication is suitably pipe-specific, such as pipe0_nopredict and pipe1_nopredict.

Figure 5B:
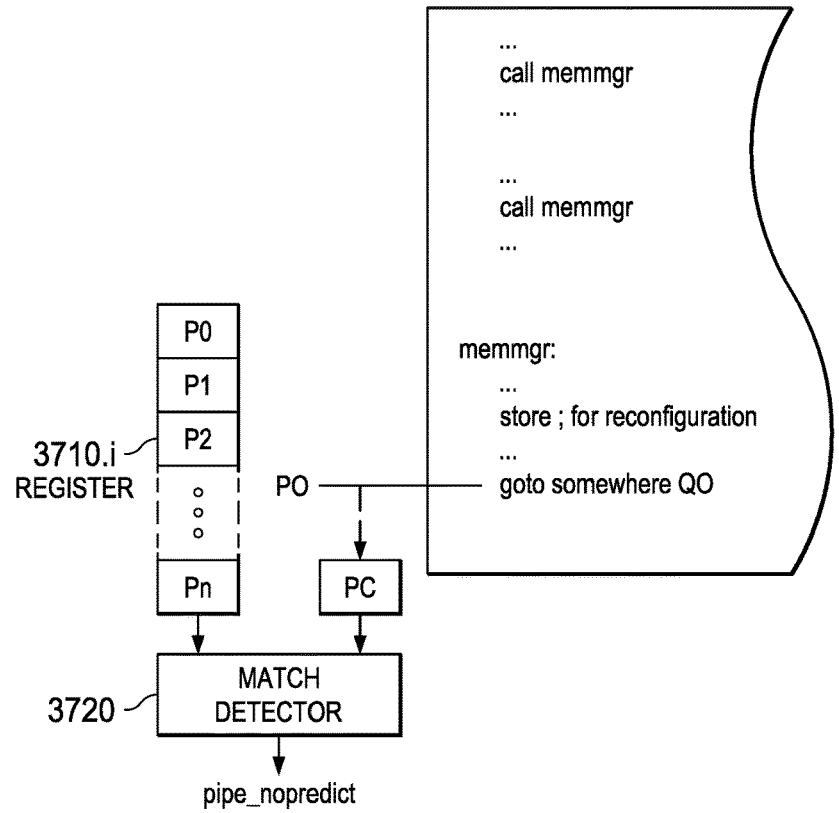
FIG. 5B is a block diagram of an inventive electronic circuit for inventively identifying and responding automatically to particular instances of branch instructions by their addresses and introducing a pipeline qualification to override or disable branch prediction for the particular instances of branch instructions.

In FIG. 5B, some alternative embodiments provide one register or a few registers in the system respectively pointing to one or more branch instructions that are not-to-be-predicted by providing their memory addresses P0, P1, P2, . . . Pn. Remarkably, this will work because even a large application is likely to have one or just a few memory manager subroutines. For instance, let a branch instruction "goto Q0" have the memory address P0 in the application. Notice that nearby the memory address P0 is an earlier instruction "store; for reconfiguration". The proximity of the earlier store instruction makes the nearby the branch instruction at memory address P0 prone to a pipeline hazard as described elsewhere herein. A register set 3710 has the address P0 entered into a register 3710.0 therein. Register set 3710 is coupled to a Match Detector 3720. The program counter PC is also coupled to an input of Match Detector 3720. Match Detector 3720 outputs an active indication pipe_nopredict when the contents of program counter PC match the value in one of the i-indexed registers 3710.*i* in the register set 3710. In this way, no saturation qualifier is appended to the instruction "goto Q0" and instead the Match Detector automatically determines when the processor has reached a hazard-prone branch instruction by telling by address of the branch which branch is not to be predicted.

As described, a pipeline hazard is created from an action performed by an instruction being executed in a late stage of the pipe (for example, triggering a copy of the program code from one location to another) and the fetch of this new program code, which is at a first or early stage of the pipe). The branch prediction is relevant here because, with a code with discontinuities, it is possible that the code executed has been fetched from a non-updated area.

Unless the memory space overlay is properly completed before fetch from that target address access, even if the prediction of whether the branch is taken or not-taken is correct and the target address to use in the BTB/BTAC (Branch Target Buffer or Branch Target Address Cache) is correct, the contents fetched/accessed at the target address Q0 will not be the right contents. Some embodiments of improved branch qualification hardware herein turn off or override the branch prediction mechanism because the fetch should be delayed because otherwise the fetch will fetch from the right address but in the wrong memory space and thus put the wrong instruction in the instruction queue. Instead, the fetch is desirably and assuredly delayed so that the fetch occurs after the memory overlay re-configuration or modification is completed, and this result is forced and obtained when the branch instruction is qualified to not be predicted.

If the branch predictor were completely turned off or inactivated during an entire application, all the branch instructions would not be predicted anymore and an undesirable performance impact would occur during the time and because the branch predictor is off. Also, if the action of turning off the branch predictor is performed by a late stage in the pipeline by writing to a register location, then some branches could have already been also predicted and be within the pipeline. What some of the embodiments provide is a simple way to force a target address to be re-fetched whatever the prediction may be when a branch is executed. Such embodiments need not turn off the prediction mechanism but do force the fetch of the target address when the branch is actually executed.

In the description here, it is shown how to inactivate and re-activate the branch predictor as soon as the memory overlay is actually completed so that much benefit can be gotten from branch prediction. If a small performance loss is incurred, it is quite acceptable to overcome the pipeline hazard.

Figure 6:
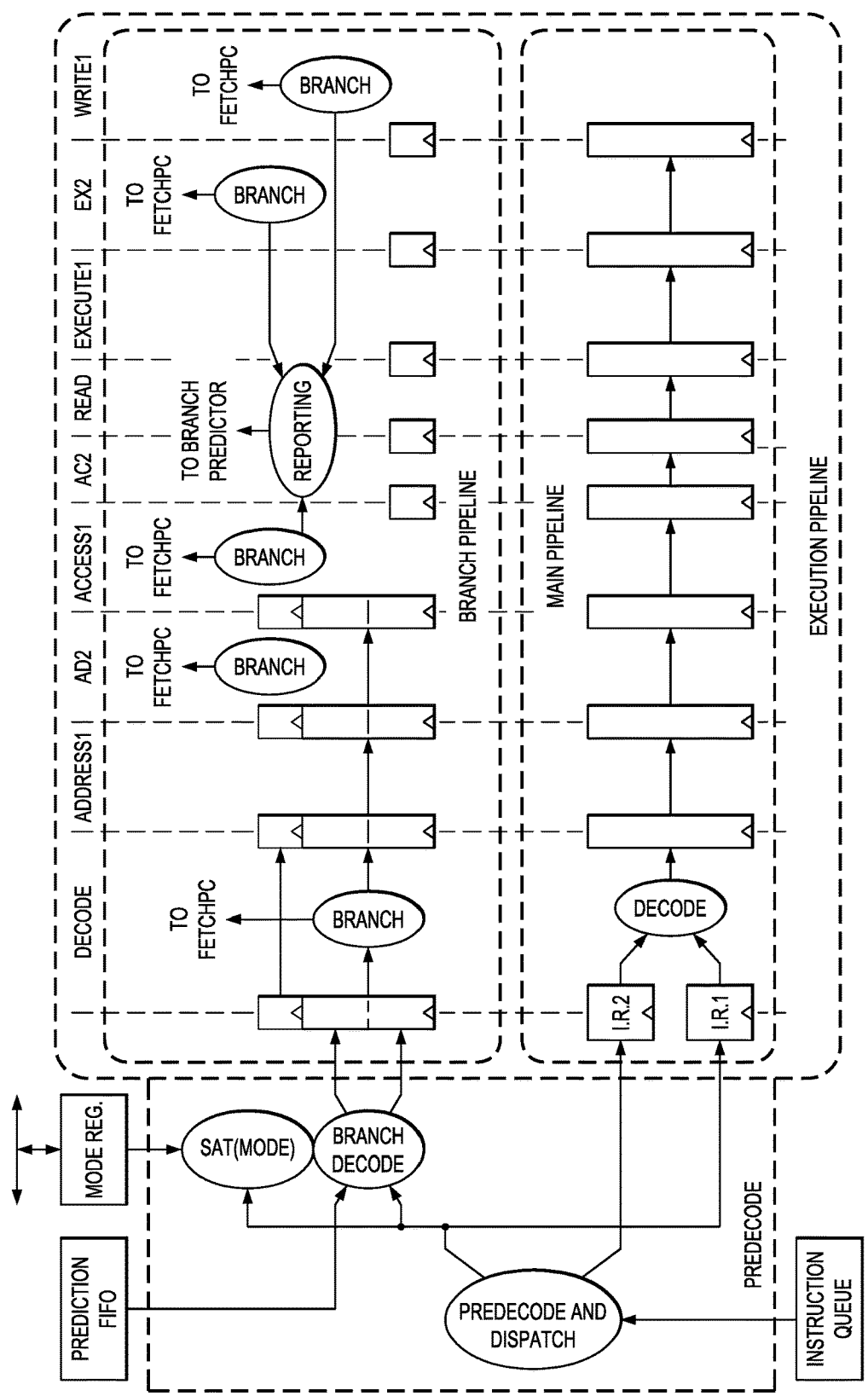
FIG. 6 is a block diagram of an inventive processor having branch prediction and an inventive branch instruction qualifier decoder combined with an inventive qualifier mode register, and wherein branch instructions have an inventive mode-based branch instruction qualifier for decoding by the inventive branch instruction qualifier decoder so that the branch instruction qualifier is activated when the instruction qualifier is being decoded by the inventive branch instruction qualifier decoder in at least one of the modes as an activating mode represented by the qualifier mode register.

Some other embodiments enable or disable the action of the qualifier by setting a bit, such as a mode bit or bit field, in the processor hardware as shown in FIG. 6. The bit or bit field is dynamically modifiable such as by providing it in a writeable register MODE REG that is written prior to the program reaching the branch. The bit or bit field is suitably either established in a status register or in a mode register of the processor hardware.

In FIG. 6, a mode bit Mode is provided in a register MODE REG that is coupled to the hardware for detecting or decoding the qualifier sat( ) For instance, this coupling is more fully direct and low-or-no-latency type than the time delay to be provided to overcome the pipeline hazard to which the qualifier is applied.

The qualifier is designated sat(Mode) in FIG. 6 or nopredict(Mode) to indicate that the qualifier is dynamically modifiable in response to the Mode bit or bit field. Open parentheses are suitably used to indicate that the qualifier sat( ) or nopredict( ) is active by its presence in the program code, so that presence of the qualifier and active state of the qualifier are one and the same. Open parentheses can also be used to refer to a qualifier of either type—responsive to a Mode bit/bit field or active by presence of the qualifier alone.

Thus, in FIG. 6 the branch instruction qualifier is activated when the instruction qualifier is being decoded by the branch instruction qualifier decoder for sat(Mode), or BPQ (Mode) of FIG. 4, in at least one of the modes as an activating mode represented by the qualifier mode register MODE REG in FIG. 6. The qualifier mode register in some embodiments can be written over a bus in the system as indicated by the horizontal bus above MODE REG in FIG.

6. Write access to the qualifier mode register MODE REG is suitably limited to boot code and program code running at an appropriate level of security and privilege.

Notice that a lookup to BTB to find any branch, conditional or unconditional, is a prediction process in the usage of terminology herein. Consider the cases below:

a) Instructions are fetched, decoded then identified as a branch (cond/uncond) and processed without prediction.

b) Instructions are fetched at the same time unconditional branch is expected to be present. The branch will be identified later as planned.

c) Instructions are fetched, conditional. The branch will be identified and processed, from which the expected or predicted branch direction can be invalidated.

Cases b) and c) at first might seem different. Compared to case (a), however, the cases (b) and (c) are actually relatively similar in being predicted and are each quite different from case (a).

Figure 15:
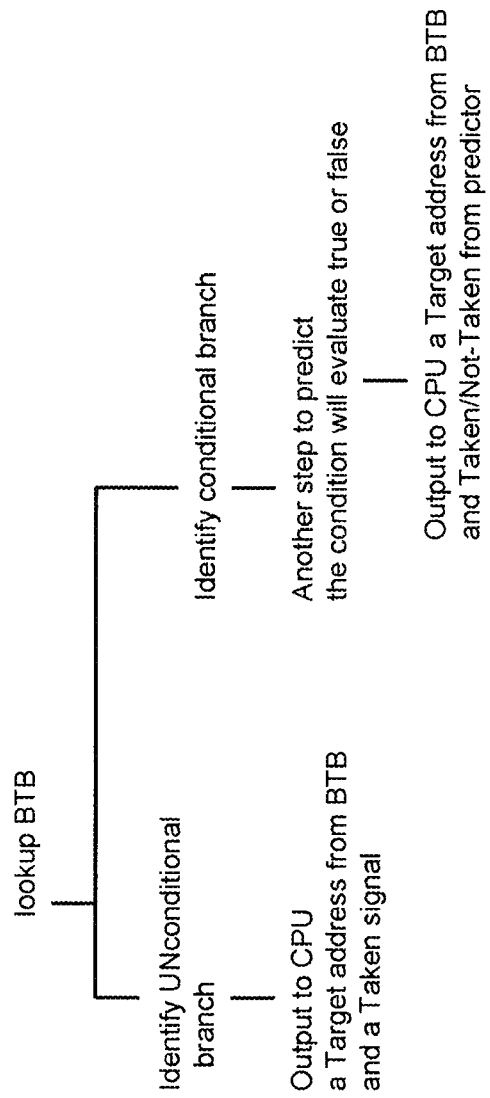
FIG. 15 is a flowchart illustrating a branch prediction process according to some examples.

In TABLE 4 of FIG. 15, a flowchart tabulates and summarizes an overall branch prediction process for conditional and unconditional branches.

In one example of a digital signal processor (DSP), the signals from the branch predictor to the instruction fetch logic include:

Hit bit: '1' when any branch (cond or uncond) is predicted,

'0' when no prediction (miss from BTB).

Taken bit:

'1' when branch will be taken (two cases: unconditional branch, or a conditional branch whose condition will evaluate true), '0' when branch will be non-taken (a conditional branch whose condition will evaluate false).

Target: Branch target address from BTB, not used in case of a Not-Taken prediction.

It could happen that the overlay memory space can get changed on a non-taken branch. Some branch qualification embodiments accordingly are operative even if the branch is not taken, which adds logic circuit content beyond TABLE 2 of FIG. 14 as shown in TABLE 5 of FIG. 16. For instance, the code could branch backward until the overlay is completed. A code example is shown in TABLE 6C and TABLE 6E. The overlay memory space could be located on the non-taken path of the conditional branch.

"After" TABLE 5 of FIG. 16 shows changes and improvements using branch prediction qualification, with differences highlighted relative to TABLE 1 of FIG. 13. A blank TABLE 5 cell entry means the entry is same as and unchanged from TABLE 1. In other words, the cell for Taken-predicted and Taken Actual is changed in TABLE 5 compared to TABLE 1. Moreover, the cell for Not-Taken-predicted and Not-Taken Actual is changed in TABLE 5 compared to TABLE 1.

The nopredict( ) qualifier can be bound in some embodiments with conditional branch instructions.

For nopredict( ) on conditional branch, TABLES 6A and 6B show two program code excerpts that appear identical in function.

TABLE 6A

PROGRAM CODE FOR BRANCH

ST ; reconfiguration
wait: if (not_done) goto wait
    goto new

TABLE 6B

PROGRAM CODE FOR SIMILAR BRANCH

ST ; reconfiguration
wait: if (done) goto new
    goto wait

TABLE 6C

REVISED 6A PROGRAM CODE FOR BRANCH QUALIFIER

ST ; reconfiguration
wait: if (not_done) goto wait // Non-Taken When Overlay Completes
    goto new || nopredict( )
new: Program area being overlaid...

TABLE 6D

REVISED 6B PROGRAM CODE FOR SIMILAR BRANCH QUALIFIER

ST ; reconfiguration
wait: if (done) goto new || nopredict( ) // Non-Taken When Overlay Completes
    goto wait
new: Program area being overlaid...

TABLE 6E

ANOTHER REVISED 6A PROGRAM CODE FOR BRANCH QUALIFIER do overlay
Wait:   If (overlay not done) branch to wait || nopredict( ) //
Non-Taken When Overlay Completes
    Goto New
New: Program area being overlaid...

Comparing TABLES 6A and 6B, the branch targets are swapped in accordance with the condition being inverted (logically complemented, not done vs. done) in two sets. In the sequence, a branch instruction "goto new (either conditional or unconditional)" being correctly taken-predicted, has a pipeline hazard regarding the reconfiguration. Thus, as shown in TABLE 6C, a user adds a nopredict( ) qualification to an unconditional branch "goto new" of TABLE 6A. As shown in TABLE 6D, a user adds a nopredict( ) qualification to a conditional branch "if (done) goto new" of TABLE 6B. Instruction decode hardware and branch instruction qualifier decode hardware and branch pipeline hardware of some processor embodiments support either or both styles of TABLE 6C and/or TABLE 6E. Hardware of some embodiments supports one or more styles of TABLE 6C and/or TABLE 6D and/or TABLE 6E.

Figure 7:
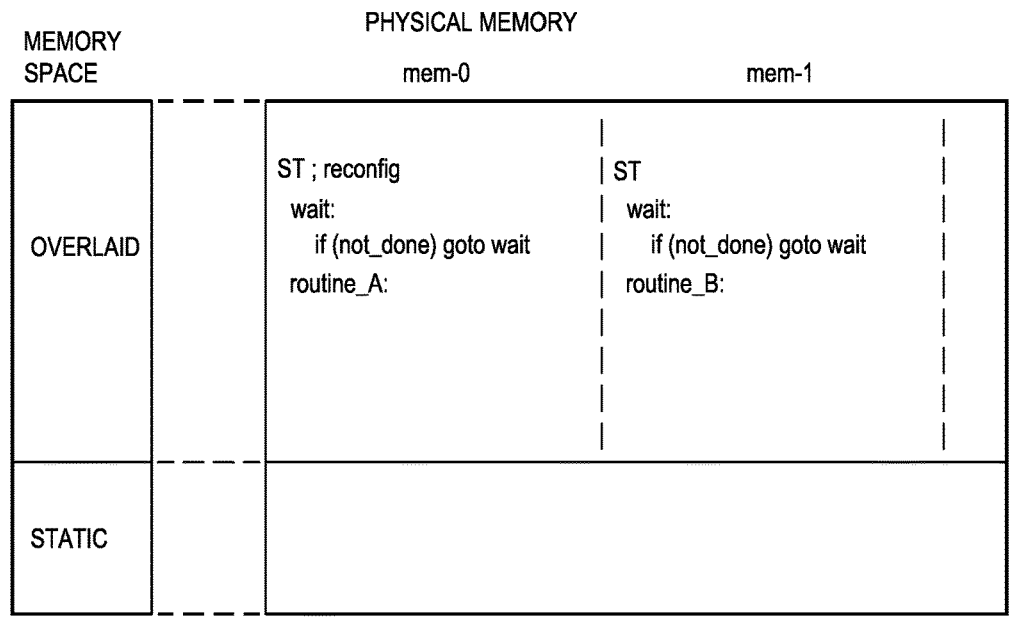
FIG. 7 is a diagram of an overlaid memory with physical memory mem-0 and mem-1 showing an inventive process of reconfiguration.

Program code as shown in FIG. 7 in some cases might feature a non-taken branch having a pipeline hazard from memory overlay. A non-taken branch means program code is executed sequentially there, and a program overlay can still occur around it. Then on any overlaid memories, a piece of code does overlaying at the identical addresses so that they are swapped at an arbitrary moment while the processor is waiting, followed by routine_A or _B in physical memory-0 or physical memory-1 respectively as shown in FIG. 7.

A pipeline hazard between memory overlay reconfiguration and an access to the newly-visible region is an important concern addressed herein. The processor is running through program code working with memories normally, and now that very memory is completely swapped (and the contents is refreshed) at some point in time. Accordingly, the contents are different and the sequence of actual program code that is executed should conform with the execution appropriate to the operating system or application program.

Program code is likely to include unconditional call and return instructions quite often. In some processors branch prediction processes for unconditional branches such as goto, call and return are handled quite similarly. When the program includes a very short subroutine that is called quite often as shown in TABLE 7, it is desirable that unconditional call/returns be predicted so that the taken target address is cached in the BTB/BTAC of the branch predictor and therefore is accessed swiftly.

TABLE 7

FREQUENTLY-CALLED SHORT SUBROUTINE for (i = 0; i < 100; i++)
    x += a_short_func(y[i]); /* compiled code has call and return unconditional */

In case a call/return takes many cycles to execute, an inline expansion of the function call, as shown in TABLE 8 can be applied to avoid the overhead.

TABLE 8

INLINE EXPANSION OF A FUNCTION CALL for (i = 0; i < 100; i++)
    x += .. y[i] .. /* write down a_short_func itself here */

Also, when the program code includes an if-then-else structure, as illustrated in TABLE 9, one conditional branch at the beginning and one unconditional are suitably provided to combine two paths.

TABLE 9

COMBINING TWO PATHS

C code:
    if (equation) {
        do_something;
    } else {
        do_elsething;
    }
compiled to machine code :
    if (cond) goto false_case
    ... ; machine codes for do_something
    ...
    goto merge
false_case:
    ... ; codes for do_elsething
    ...
    ... ; now done...
merge:

Strictly speaking, the pipeline hazard involving memory reconfiguration and branch instructions as described herein is not a dependency. A dependency between instructions, observed within pipeline, is a pipeline hazard involving cause and result. Assume a less-complex processor which has one pipeline stage to execute a math operation using a program code sequence having two successive instructions—an add instruction R0=R1+R2 followed by a register copy instruction R3=R0. When these two instructions are processed one by one, successively, no trouble is present in the single-pipestage execution unit. By contrast, suppose the execution logic of a more-complex processor is implemented with three (3) pipeline stages like Exec1) read registers out; Exec2) ALU to compute a result; Exec3) write data back to reg. The two instructions above, if executed back to back, will exhibit a dependency and the three pipestages of the more complex processor fail to deliver the same result as the one pipeline stage of the less-complex processor. The three-pipestage pipeline instead operates as shown in TABLE 10:

TABLE 10

DEPENDENCY IN THREE-PIPESTAGE PIPELINE

-> cycle

| | | | |
|---|---|---|---|
| Ex1 | Add | Cpy | |
| Ex2 | Add | | Cpy |
| Ex3 | Add | | Cpy |
| R0 | | X___renewed__ | |

The copy instruction can read R0 only after the result of the addition is available at R0. This is the pipeline hazard, which was brought by the fact that the second instruction is dependent to the (result of) the first. There are many other types of and variations for pipeline hazards. Also, several techniques can reduce the penalty cycles. In the above example, two (2) cycles are lost. Some more-advanced hardware loses one (or even zero) cycles.

The execution of a branch in the context of branch prediction can be changed when qualified. In TABLE 2, when an unconditional branch instruction is qualified, the execution of that unconditional branch instruction triggers the fetching of the data at the target address whether this branch has been predicted or not. When a conditional branch is qualified, the behavior of the conditional branch instruction can be defined differently or variously depending on the embodiment. In some embodiments for conditional branch instruction, the qualifier automatically triggers the fetching of the true or false path depending upon the evaluation of the condition of that branch, regardless of previous prediction. In some other embodiments as in TABLE 2, the qualifier triggers on the fetching of the true path at the target address of this conditional branch when the condition is evaluated true, without having any special effect when the condition is evaluated false. In some further embodiments as in TABLE 5, the qualifier triggers on the fetching of the true path (Taken) at the target address of this conditional branch when the condition therein is evaluated true by actual execution in the execute pipeline, and the qualifier triggers on the fetching on the sequential instruction path (Not-Taken) when the condition in the conditional branch instruction is evaluated false by actual execution in the execute pipeline. In these various embodiments, hardware can be provided as discussed in regard to FIG. 3C to disable the update of the branch prediction module, branch target buffer BTB/BTAC for example, when a branch instruction is qualified.

In some embodiments, other instructions modify the one-bit qualifier of the branch instruction dynamically in execution. If the program and the data space are the same, a data access can modify any opcode. This type of embodiment is a little more complex because the qualifier adds one more byte within the instruction stream. Dynamically modifying the one-bit qualifier in that way delivers a degree of benefit to an application in a sense that when there is no program overlay, the branch would be predicted. When a program overlay is going to happen, the branch is modified to not be predicted.

A nopredict( ) qualifier in the code can be deactivated on the fly by self-modifying code in some embodiments. Self-modifying code can execute the dynamic modification of the qualifier. The program code is validated and verified as to its quality. Mixture of data and program on a stored-program processor system is also used by some computer viruses. Some machines will not execute such code.

Some embodiments temporarily and effectively disable the branch prediction mechanism with respect to a specified single branch instruction by qualifying the branch instruction. Program overlay is thus effectively supported in a branch prediction context, with a minimum of software modification. The hardware correctly fetches the instructions at the target address when a qualified branch instruction is executed in the pipeline and overrides or disables any previous prediction of the branch instruction without having to globally disable then re-enable the branch prediction mechanism for all branch instructions in a program.

Attention to data overlay is helpful regarding a processor having a pipeline structure that is designed for a memory-operand instruction set. Data overlay considerations also apply to processor such as a RISC processor that uses register operands and immediate values only.

A typical memory-operand processor pipeline (simplified) is illustrated here.

i-fetch decode mem-rd execute mem-wr

The characteristic here is that, a computing instruction takes memory operand, like, "add a memory contents pointed to by AR0 into accumulator AC0." For a store instruction to store an accumulator value, the store ("mem-wr" above) pipeline follows the execution stage. This can even support a memory-to-memory data move instruction without disturbing the pipeline.

A typical RISC pipeline (simplified) is illustrated as follows:

i-fetch decode execute/
mem-access(rd/wr)

The biggest difference here is that a computing instruction takes register operands and possibly an immediate value embedded in the instruction only. A memory access pipeline is put parallel to the execution stage(s), which is activated with simple load-to-register or store-from-register instructions.

Two types of resolution are discussed next.

A first type of resolution schedules the instructions by hand, as represented by the following code:

```
mem-wr;  to reconfig data space
NOP   ; no operation instruction
NOP   ;         to preserve the
NOP   ;
NOP   ;
mem-rd;         memory read from reconfigured region
```

In this first type of resolution, NOP (no operation) instructions are inserted so that the order of requests (write then read) is preserved at the CPU boundary. The number of NOPs required can be determined or derived from the pipeline construction.

A second type of resolution asks for and gets help from hardware, as represented by the following code:

```
I/O-wr ;        to reconfig data space
mem-rd;         from reconfigured region
```

Some processors have I/O space parallel to data memory space, where non-memory peripherals like serial ports are or can be connected. If the memory overlay hardware (or its configuration register) is mapped to the I/O space instead of memory space, an I/O write class of data store instruction is suitably provided. For the I/O write class of data store instruction, the order of the memory access is preserved by hardware-generated stall cycles inserted between a given two hazardous instructions.

The latter type of resolution is smarter; the former type of resolution is still acceptable if the overlay control register is accessible in memory space or in I/O space. Note that, the former type of resolution also works at program overlay, with different number of NOPs.

In processors with branch prediction the hazard problem is even more serious as noted in regard to FIG. 1C, but solved by getting the control back to the user in some embodiments.

Within a branch-predicted processor system, a branch instruction can be processed in two different ways depending on correct prediction or wrong prediction:
1) when the branch is correctly predicted, the execution pipeline does nothing explicitly but just verifies the prediction was correct.
2) when the branch is wrongly predicted or non-predicted, the execution pipeline performs a branch operation. Expressed in more detail, the execution pipeline verifies the prediction first, then finds it was wrong (or non-predicted), and then finally performs appropriate operation for that branch instruction.

The first case of correct prediction collides with the discussion above on the very point of the correct ordering of data- or I/O-write for reconfiguration and succeeding program-read. For a certain type of branch instruction, it is better to be processed in the other style wherein the execution pipeline handles it.

In other words, the branch instruction qualifier usefully turns off or overrides the branch prediction even when the branch is correctly predicted because handling the branch by actual execution in the execution pipeline overcomes the pipeline hazard involved with memory overlay reconfiguration nearby in program code. If the branch is wrongly predicted, the processor architecture actual execution of the branch discovers the wrong prediction and sets things right with the branch at the right time and avoids the pipeline hazard as well. Heretofore, if the branch was correctly predicted, the system loses control of the pipeline hazard and the user loses control. The teachings herein show how to get this control back even when the branch is correctly predicted so that the pipeline hazard is obviated and overcome. As described, a specific branch instruction is thus tagged with the nopredict( ) qualifier in some of the embodiments.

A reason why the qualifier approach described herein need not usually be applied in the distinct area of obtaining non-instruction data (data that is not a fetched instruction)

from overlaid memory is as follows. The memory spaces are reconfigured by a store ST instruction and the data is obtained by a data load LD or data store ST instruction. ST and LD are executed at the same place in the pipeline in most architectures, so reconfiguration and non-instruction data access do not get executed out of order. Also, there is no branch prediction in non-instruction data access to load up an instruction queue and exacerbate the situation that pertains when fetching instructions. Therefore, there is no need to apply any qualifier to the LD instruction for the case of non-instruction data when the foregoing assumptions apply. But the qualifier is used in some embodiments for branch/instruction fetch for all the reasons discussed herein. Moreover, the qualifier can be and is contemplated to be applied to data store ST||sat( ) and LD||sat( ) in any architecture where reconfiguration and non-instruction data access do risk getting executed out of order from one another so that the wrong memory space is accessed without application of the qualifier.

Furthermore, the qualifier can be and is contemplated to be applied to data store ST||sat( ) and LD||sat( ) in any embodiment where it is desired for the programmer to identify which instructions are reconfiguration instructions to avoid the risk of nearby branch instructions getting executed out of order from the reconfiguration instruction(s) so that the wrong memory space is accessed without application of the qualifier. In some embodiments of the circuitry of FIG. 8, the instruction decoder detector 4220 detects the qualifier sat( ) or BPQ in conjunction with a store instruction or other reconfiguration instruction. The qualifier thus indicates that this instruction is a reconfiguration instruction and activates the Range Comparator 4230 to look for nearby hazard-prone branch instructions as described in FIG. 8. Even though the nearby branch instructions lack a qualifier, they are regarded as hazard-prone if and by virtue of lying within Capture Range CR. CR is a range of proximity established statically or dynamically for avoiding dependency hazard. For instance, the range of proximity in different embodiments is suitably a statically predetermined range of instruction addresses, a number of instructions, number of clock counts, or otherwise. The range for CR in some embodiments is dynamically extended until the store instruction completes its operation and reports completion to a register.

Pipeline hazard can be resolved by delaying the progress of the lately-dispatched or recently-dispatched instruction. The type of pipeline hazard discussed here is resolved by hardware in some embodiments as in FIG. 8 by decoding the reconfiguration instruction and adding a qualification indication pipe_nopredict to any branches within a predetermined range of addresses. The range can depend on cache latency. The instruction to reconfigure memory space can be simple, such as a store-data-to-memory (or store-data-to-IO) instruction, whose target is just chosen to point to some specific register or device in a memory controller or the like. See FIGS. 8 and 9.

Figure 8:
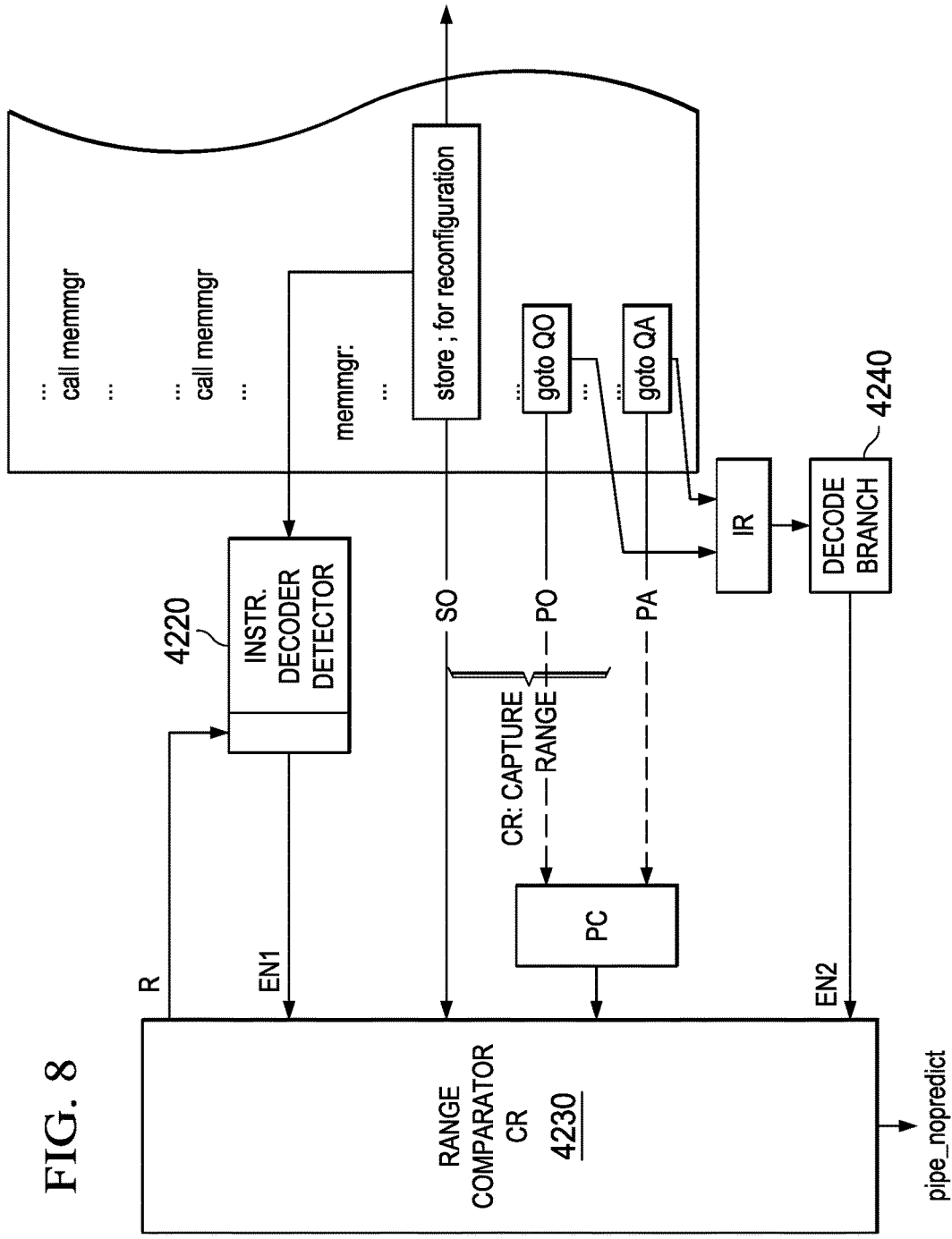
FIG. 8 is a block diagram of an inventive electronic circuit that includes hardware for identifying by particular store instruction codes in a program memory and responding automatically to particular instances of store instructions for reconfiguration and introducing a pipeline qualification to override or disable branch prediction for nearby instance(s) of branch instructions that are nearby each particular instance of such store instruction in a Capture Range in program memory address space.
Figure 9:
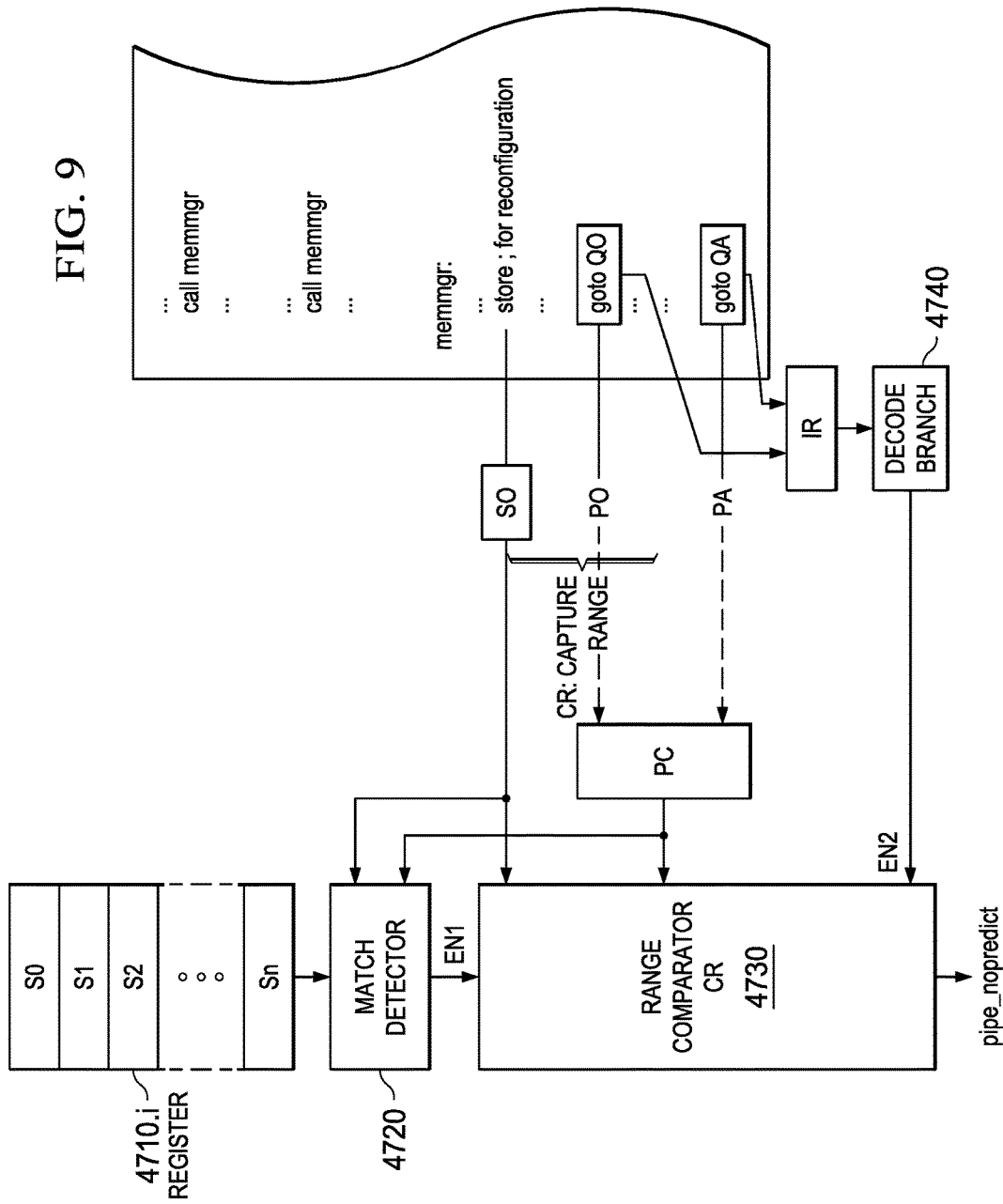
FIG. 9 is a block diagram of another inventive electronic circuit for identifying by particular store instruction addresses in a program memory and responding automatically to particular instances of store instructions for reconfiguration and introducing a pipeline qualification to override or disable branch prediction for nearby instance(s) of branch instructions that are nearby each particular instance of such store instruction in a Capture Range in program memory address space.

In FIGS. 8 and 9, some embodiments implement hardware that monitors store instructions to determine if they access MMU or the specific memory-overlay mechanism. Once a store instruction does access MMU or the specific memory-overlay mechanism, the first branch instruction afterward in the execution pipeline is given more attention by again executing that first branch instruction that is first afterward. Trailing instructions in the execution pipeline from branch target address might not be reflecting new configuration. Accordingly, those trailing instructions are invalidated and then fetched again to be re-executed.

In FIG. 8, hardware includes an instruction decoder detector 4220 that monitors store instructions to determine if they access MMU or the specific memory-overlay mechanism. Detector 4220 encounters an instruction "store; for reconfiguration" in the code, and responds by delivering an enable output EN1 to a Range Comparator 4230 to receive the address S0 of this store instruction. Range Comparator 4230 has another input for program counter PC, and is enabled by enable EN1 to compare addresses in program counter PC so long as they lie in a predetermined Capture Range CR of address space that begins with the address S0 of the store instruction "store; for reconfiguration". As instructions from the application appear in an instruction register IR, they are monitored by a Decode Branch block 4240 to determine whether a branch instruction is currently in the instruction register IR. If so, an enable output EN2 is fed from Decode Branch block 4240 to the Range Comparator 4230. Range Comparator automatically delivers an active output indication pipe_nopredict if the address P0 in the program counter PC for a branch instruction detected by Decode Branch block 4240 is within Capture Range CR proximity to address S0 of the store instruction "store; for reconfiguration". In this way, the hardware of FIG. 8 determines automatically to tell from the reconfiguration instruction and Capture Range which branch is hazard-prone and therefore not to be predicted. The active output indication pipe_nopredict is coupled to logic as in FIG. 3C to turn off, prevent, or override the branch predictor as well as to fully execute the branch instruction found at address P0 so that actual branch execution in effect runs a first time speculatively and a second time actually, and thereby causes invalidation of any improvidently fetched instructions and properly executes the program code. When the PC advances beyond the Capture Range as in the case of address $P_A$ in FIG. 8, the enables for Range Comparator 4230 are inactivated and an output register of detector 4220 is reset whereupon the process is ready to begin again.

In FIG. 9, some alternative embodiments provide one register or a few registers in the system respectively pointing to one or more reconfiguration instructions that may have hazard-prone branch instructions nearby that are not-to-be-predicted. The reconfiguration instructions are specified by providing their memory addresses S0, S1, S2, . . . Sn. Remarkably, this will work because even a large application is likely to have one or just a few memory manager subroutines or reconfiguration instructions such as "store; for reconfiguration". For instance, let a branch instruction "goto Q0" have the memory address P0 in the application. Notice that nearby the memory address P0 of the branch instruction is an earlier instruction "store; for reconfiguration" located at memory address S0. The proximity of the earlier store instruction at memory address S0 makes the nearby branch instruction at memory address P0 prone to a pipeline hazard as described elsewhere herein. A register set 4710 has the address S0 entered into a register 4710.0 therein. Register set 4710 is coupled to a Match Detector 4720. The program counter PC is also coupled to an input of Match Detector 4720. Match Detector 4720 outputs an active enable EN1 to a Range Comparator 4730 when the contents of a program counter PC match the value in one of the i-indexed registers 4710.i holding memory addresses S0, S1, S2, . . . Sn in the register set 4710. In this way, the Match Detector 4720 monitors instruction addresses of store instructions to in-effect determine if they access MMU or the specific memory-overlay mechanism. No saturation qualifier is appended to the instruction "goto Q0" and instead the Match Detector 4720 automatically determines when the processor may be in the vicinity of a hazard-prone branch instruction by generating active the enable EN1 in response to address Si of the reconfiguration instruction. The active enable output EN1 is fed to a Range Comparator 4730 to receive the address S0 of this reconfiguration-pertinent store instruction. Range Comparator 4730 has another input for program counter PC, and is enabled by enable EN1 to compare addresses in program counter PC so long as they lie in a predetermined Capture Range CR of address space that begins with the address S0 of the store instruction "store; for reconfiguration". As instructions from the application appear in an instruction register IR, they are monitored by a Decode Branch block 4740 to determine whether a branch instruction is currently in the instruction IR. If so, an enable output EN2 is fed from Decode Branch block 4740 to the Range Comparator 4730. Range Comparator 4730 automatically delivers an active output indication pipe_nopredict if the address P0 in the program counter PC for a branch instruction detected by Decode Branch block 4740 is within Capture Range CR proximity to address S0 of the store instruction "store; for reconfiguration". In this way, the hardware of FIG. 9 determines automatically to tell from the address S0 of the reconfiguration instruction and Capture Range CR which branch is hazard-prone and therefore not to be predicted. The active output indication pipe_nopredict is coupled to logic as in FIG. 3C to turn off, prevent, or override the branch predictor as well as to fully execute the hazard-prone branch instruction found at address P0 so that the branch instruction in effect runs a first time speculatively and a second time actually. Actual branch execution thereby causes invalidation of any improvidently fetched instructions and properly executes the program code. When the PC advances beyond the Capture Range as in the case of address $P_A$ in FIG. 9, the enables for Range Comparator 4730 are inactivated whereupon the process is ready to begin again.

Some other hardware embodiments can resolve the pipeline hazard by adding some amount of logic. The memory controller is designed to notify back to the CPU that the memory space of the CPU has just been reconfigured. Receiving that notification, CPU verifies if each succeeding instruction in its pipeline is correctly fetched from newly-visible memory, and if not, to invalidate such succeeding instruction. A mechanism is provided to annihilate instructions already in the pipeline, and address comparators are used to verify each instruction. This strategy can become problematic if the system designer builds an off-chip memory controller system with its own overlay control because the notification back to the CPU would presumably need to involve an interface or coupling back from the off-chip memory controller in order for the CPU to be able to respond to a completed memory space reconfiguration event. The strategy becomes problematic because a chip, in which the CPU and its system is enclosed, may not have a coupling or interface to receive information that the new configuration has taken effect off-chip. Thus, the mechanism might not be triggered to verify and invalidate incorrect instructions.

The prediction of a branch suitably happens at the fetch stage for instance. Depending on particular processor architecture, it may not be possible to verify a prediction at the fetch stage if the target is correct, because the instruction stream may not be decoded yet or insufficiently decoded. The decoding can be complex in a processor that supports variable length instructions and hardware loop mechanism, for instance, and branch prediction verification may be better done separately.

When the branch prediction returns a hit at the fetch stage, it could happen for an Unconditional branch as well, so the instruction(s) at the target address can also be fetched. The verification of prediction for an unconditional branch can be provided in decode stage, and thus the verification may be obtainable sooner for an unconditional branch than for a conditional branch.

On some other processors the instructions may be almost all the same size and aligned. A predecode mechanism operative in fetch stage can be provided to allow a direct branching at the fetch stage so that branch prediction is not needed for unconditional branches.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMM), 10) multiple instruction multiple data (MIMD), 11) multiple-core using any one or more of the foregoing, and 12) microcontroller pipelines, control peripherals, and other micro-control blocks using any one or more of the foregoing.

Figure 10:
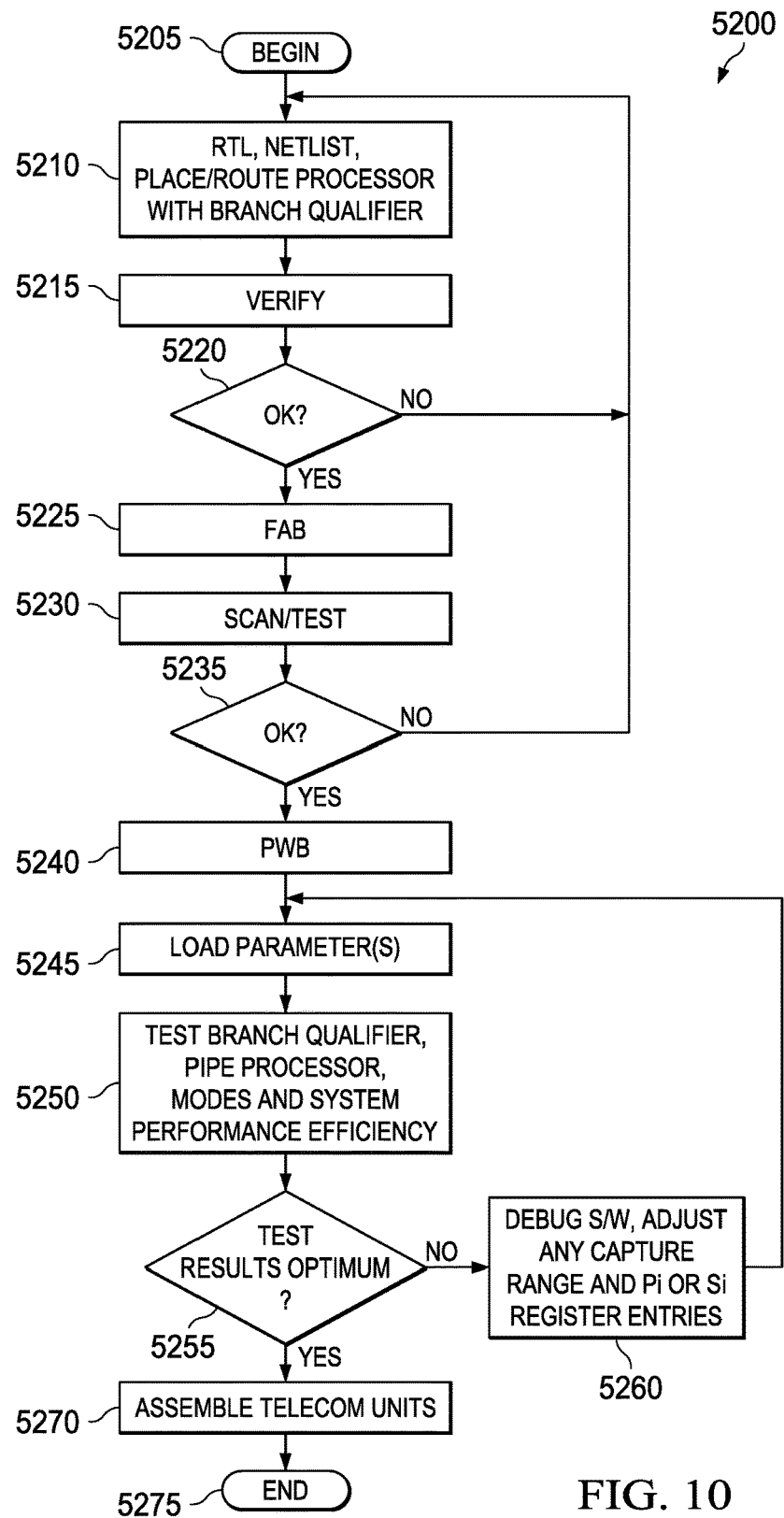
FIG. 10 is a flow diagram of an inventive process of manufacturing various embodiments of the invention.

In FIG. 10, various embodiments of an integrated circuit improved as described herein are manufactured according to a suitable process of manufacturing 5200 as illustrated in the flow of FIG. 10. Operations commence with a BEGIN 5205 and a step 5210 establishes hardware design code RTL, produces a netlist, and places and routes a processor with branch qualifier hardware as described elsewhere herein. The design of step 5210 is verified in a step 5215 and if not ok at an evaluation step 5220, operations go back to steps 5210 and 5215 until evaluation 5220 determines that they are acceptable. The integrated circuit chips that realize the design of the processor with branch qualifier hardware are fabricated in a wafer fab at step 5225 and they are tested such as by scan testing of various registers in powered operations of one or more chips in a step 5230. If the testing fails to pass a step 5235, operations suitably go back to the earlier steps to yield good chips, or if the chips are just a few, they are discarded and the remaining large majority of the chips are kept and delivered for system integration at a step 5240. In the step 5240, one or more of the chips is put on a printed circuit board of a system for FIG. 12 and/or FIG. 11. A step 5245 loads software and branch qualifier information and any parameters to a flash memory which is also integrated on the printed circuit board. A step 5250 tests the inventive system including the branch qualifier pipeline processor, and any modes as in FIG. 6, and system performance and pipeline efficiency for executing an application having one or more qualified branch instructions. An evaluation step 5255 determines whether the test results are satisfactory or optimum, and if not, operations go to a step 5260 to debug the software, adjust Capture Range CR in case of embodiments of FIG. 8 and FIG. 9, and establish correct register entries of the addresses Pi or Si in some embodiments. Then operations 5245, 5250 and 5255 are repeated whereupon successful system operation is achieved. Telecom units are assembled in a step 5270 and delivered, whereupon an END step 5275 step is reached.

Figure 11:
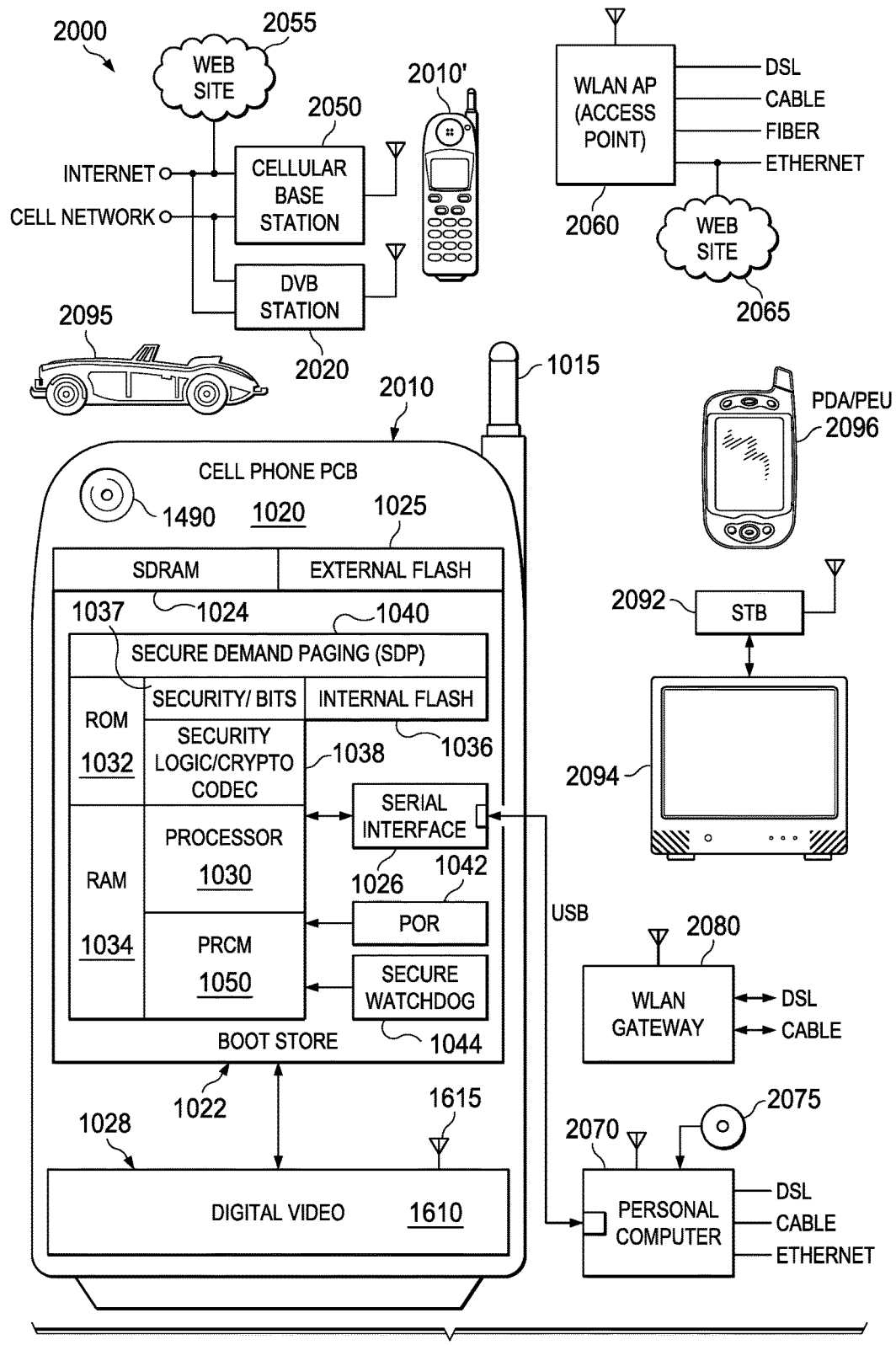
FIG. 11 is a pictorial diagram of inventive communications system embodiments including inventive system blocks, for example a cellular base station, a DVB video station, a WLAN AP (wireless local area network access point), a WLAN gateway, a personal computer, a set top box and television unit, and two cellular telephone handsets, any one, some or all of the foregoing improved according to the invention.

In FIG. 11, an improved communications system 2000 has system blocks as described next and improved with any one, some or all of the circuits and subsystems shown in FIGS. 1A-9. Any or all of the system blocks, such as cellular mobile telephone and data handsets 2010 and 2010', a cellular (telephony and data) base station 2050, a WLAN AP (wireless local area network access point, IEEE 802.11 or otherwise) 2060, a Voice over WLAN gateway 2080 with user voice over a packet telephone (not shown), and a voice enabled personal computer (PC) 2070 with another user voice over packet telephone (not shown), communicate with each other in communications system 2000. Each of the system blocks 2010, 2010', 2050, 2060, 2070, 2080 is provided with one or more PHY physical layer blocks and interfaces as selected by the skilled worker in various products, for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 2050 two-way communicates with the handsets 2010, 2010', with the Internet, with cellular communications networks and with PSTN (public switched telephone network).

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), voice over packet and voice over Internet protocol (VoP/VoIP), and other services accommodates and provides security for secure utilization and entertainment appropriate to the just-listed and other particular applications.

The embodiments, applications and system blocks disclosed herein are suitably implemented in fixed, portable, mobile, automotive, seaborne, and airborne, communications, control, set top box 2092, television 2094 (receiver or two-way TV), and other apparatus. The personal computer (PC) 2070 is suitably implemented in any form factor such as desktop, laptop, palmtop, organizer, mobile phone handset, PDA personal digital assistant 2096, internet appliance, wearable computer, content player, personal area network, or other type.

For example, handset 2010 is improved for selectively determinable functionality, performance, security and economy when manufactured. Handset 2010 is interoperable and able to communicate with all other similarly improved and unimproved system blocks of communications system 2000. Camera 1490 provides video pickup for cell phone 1020 to send over the internet to cell phone 2010', PDA 2096, TV 2094, and to a monitor of PC 2070 via any one, some or all of cellular base station 2050, DVB station 2020, WLAN AP 2060, STB 2092, and WLAN gateway 2080. Handset 2010 has a video storage, such as hard drive, high density memory, and/or compact disk (CD) in the handset for digital video recording (DVR) such as for delayed reproduction, transcoding, and retransmission of video to other handsets and other destinations.

On a cell phone printed circuit board (PCB) 1020 in handset 2010, is provided a higher-security processor integrated circuit 1022, an external flash memory 1025 and SDRAM 1024, and a serial interface 1026. Serial interface 1026 is suitably a wireline interface, such as a USB interface connected by a USB line to the personal computer 1070 and magnetic and/or optical media 2075 when the user desires and for reception of software intercommunication and updating of information between the personal computer 2070 (or other originating sources external to the handset 2010) and the handset 2010. Such intercommunication and updating also occur via a processor in the cell phone 2010 itself such as for cellular modem, WLAN, Bluetooth from a website 2055 or 2065, or other circuitry 1028 for wireless or wireline modem processor, digital television and physical layer (PHY).

In FIG. 11, processor integrated circuit 1022 includes at least one processor (or central processing unit CPU) block 1030 coupled to an internal (on-chip read-only memory) ROM 1032, an internal (on-chip random access memory) RAM 1034, and an internal (on-chip) flash memory 1036. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to power reset and clock management (PRCM) 1050. A device-unique security key is suitably also provided in the E-fuses or downloaded to other non-volatile, difficult-to-alter parts of the cell phone unit 1010.

The words "internal" and "external" as applied to a circuit or chip respectively refer to being on-chip or off-chip of the applications processor chip 1022. All items are assumed to be internal to an apparatus (such as a handset, base station, access point, gateway, PC, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash 1024 are also suitably used to supplement ROM 1032 for boot storage purposes.

FIG. 12 illustrates inventive integrated circuit chips including chips 1100, 1200, 1300, 1400, 1500, 1600 for use in the blocks of the communications system 2000 of FIG. 11. The skilled worker uses and adapts the integrated circuits to the particular parts of the communications system 2000 as appropriate to the functions intended. For conciseness of description, the integrated circuits are described with particular reference to use of all of them in the cellular telephone handsets 2010 and 2010' by way of example.

It is contemplated that the skilled worker uses each of the integrated circuits shown in FIG. 12, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 2050, personal computer(s) 2070 equipped with WLAN, WLAN access point 2060 and Voice WLAN gateway 2080, as well as cellular telephones, radios and televisions, Internet audio/video content players, fixed and portable entertainment units, routers, pagers, personal digital assistants (PDA), organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages.

In FIG. 12, an integrated circuit 1100 includes a digital baseband (DBB) block that has a RISC processor 1105 (such as MIPS core(s), ARM core(s), or other suitable processor, any of them having a central processing unit CPU referred to earlier hereinabove), a digital signal processor 1110, such as from the TMS320C55x™ DSP generation from Texas Instruments Incorporated™ or other digital signal processor (or DSP core), communications software and security software for any such processor or core, security accelerators 1140, and a memory controller. Security accelerators block 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1105 and 1110 for providing sequences of software instructions and data thereto. A security logic circuit 1038 has a secure state machine (SSM) 2460 to provide hardware monitoring of any tampering with security features. A Secure Demand Paging (SDP) circuit 1040 is provided for effectively-extended secure memory.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes a ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1×EV-DV, 1×EV-DO or 3×EV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing). Blocks for uplink and downlink processes of WCDMA are provided.

Audio/voice block 1170 supports audio and voice functions and interfacing. Speech/voice codec(s) are suitably provided in memory space in audio/voice block 1170 for processing by processor(s) 1105 and/or 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 2070. The serial interface includes UARTs (universal asynchronous receiver/transmitter circuit) for performing the conversion of data between parallel and serial lines. A power resets and control module 1185 provides power management circuitry for chip 1100. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 12, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1×EV-DV, 1×EV-DO or 3×EV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to the voice codec and a stereo DAC (digital to analog converter) for a signal path to the baseband block 1210 including audio/voice block 1170, and with suitable encryption/decryption activated.

A control interface 1230 has a primary host interface (I/F) and a secondary host interface to DBB-related integrated circuit 1100 of FIG. 12 for the respective GSM and CDMA paths. The integrated circuit 1200 is also interfaced to an I2C port of applications processor chip 1400 of FIG. 2. Control interface 1230 is also coupled via circuitry to interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine. Battery monitoring is provided by either or both of 1-Wire and/or an interface called HDQ.

In FIG. 12 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna and switch circuitry to both the transmit portion 1310, 1330 and the receive portion next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA demodulator 1370 to produce the I/Q or other outputs thereof (in-phase, quadrature) to the GSM/GPRS/EDGE/UMTS/CDMA baseband block 1210.

Further in FIG. 12, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller MEM CTRL 1426 with DMA (direct memory access), and a 2D (two-dimensional display) graphic accelerator. Speech/voice codec functionality is suitably processed in chip 1400, in chip 1100, or both chips 1400 and 1100.

The RISC processor 1420 and the DSP 1424 in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller 1426 in circuitry 1420 interfaces the RISC processor 1420 and the DSP 1424 via an on-chip bus to on-chip memory 1440 with RAM and ROM. A 2D graphic accelerator is coupled to frame buffer internal SRAM (static random access memory) in block 1440. A security block 1450 in security logic 1038 of FIG. 11 includes an SSM analogous to SSM 1038, and includes secure hardware accelerators having security features and provided for secure demand paging 1040 as further described herein and for accelerating encryption and decryption. A random number generator RNG is provided in security block 1450. Among the Hash approaches are SHA-1 (Secured Hashing Algorithm), MD2 and MD5 (Message Digest version #). Among the symmetric approaches are DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software. Applications processor 140 also includes PRCM 1470.

Security logic 1038 of FIG. 11 and FIG. 12 (1038, 1450) includes hardware-based protection circuitry, also called security monitoring logic or a secure state machine SSM. Security logic 1038 (1450) is coupled to and monitors busses and other parts of the chip for security violations and protects and isolates the protected areas. Security logic 1038 (1450) makes secure ROM space inaccessible, makes secure RAM and register space inaccessible and establishes any other appropriate protections to additionally foster security. In one embodiment such a software jump from Flash memory 1025 (1435) to secure ROM, for instance, causes a security violation wherein, for example, the security logic 1038 (1450) produces an automatic immediate reset of the chip. In another embodiment, such a jump causes the security monitoring logic 1038, (1450) to produce an error message and a re-vectoring of the jump away from secure ROM. Other security violations would include attempted access to secure register or RAM space.

On-chip peripherals and additional interfaces 1410 include UART data interface and MCSI (Multi-Channel Serial Interface) voice wireless interface for an off-chip IEEE 802.15 (Bluetooth and low and high rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller, and audio amplifier 1480 to stereo speakers.

External audio content and touch screen (in/out) and LCD (liquid crystal display), organic semiconductor display, and DLP™ digital light processor display from Texas Instruments Incorporated™, are suitably provided in various embodiments and coupled to interface 1410. In vehicular use, the display is suitably any of these types provided in the vehicle, and sound is provided through loudspeakers, headphones or other audio transducers provided in the vehicle. In some vehicles a transparent organic semiconductor display 2095 of FIG. 11 is provided on one or more windows of the vehicle and wirelessly or wireline-coupled to the video feed.

Interface 1410 additionally has an on-chip USB OTG interface couples to off-chip Host and Client devices. These USB communications are suitably directed outside handset 1010 such as to PC 1070 (personal computer) and/or from PC 1070 to update the handset 1010.

An on-chip UART/IrDA (infrared data) interface in interfaces 1410 couples to off-chip GPS (global positioning system block cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller or DLP™ controller and associated PWL (Pulse-Width Light) block in interfaces 1410 are coupled to a color LCD display or DLP™ display and its LCD light controller off-chip and/or DLP™ digital light processor display.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 12, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has low noise amplifier LNA in the receive path. Bandpass filtering couples WLAN RF 1540 to a WLAN antenna. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2.

Still other additional wireless interfaces such as for wideband wireless such as IEEE 802.16 WiMAX mesh networking and other standards are suitably provided and coupled to the applications processor integrated circuit 1400 and other processors in the system. WiMax has MAC and PHY processes and the illustration of blocks 1510 and 1520 for WLAN indicates the relative positions of the MAC and PHY blocks for WiMax. See also description of FIGS. 3A and 3B hereinabove.

In FIG. 12, a further digital video integrated circuit 1610 is coupled with a television antenna 1615 (and/or coupling circuitry to share antenna 1015 and/or 1545) to provide television antenna tuning, antenna selection, filtering, RF input stage for recovering video/audio/controls from television transmitter (e.g., DVB station 2020 of FIG. 1). Digital video integrated circuit 1610 in some embodiments has an integrated analog-to-digital converter ADC on-chip, and in some other embodiments feeds analog to ABB chip 1200 for conversion by an ADC on ABB chip 1200. The ADC supplies a digital output to interfaces 1410 of applications processor chip 1400 either directly from chip 1610 or indirectly from chip 1610 via the ADC on ABB chip 1200. Applications processor chip 1400 includes a digital video block coupled to interface 1410 and having a configurable adjustable shared-memory telecommunications signal processing chain such as Doppler/MPE-FEC 1620. See incorporated patent application, "Flexible And Efficient Memory Utilization For High Bandwidth Receivers, Integrated Circuits, Systems, Methods And Processes Of Manufacture" Ser. No. 11/733,831 filed Apr. 11, 2007, which is hereby incorporated herein by reference. A processor on chip 1400 such as RISC processor 1422 and/or DSP 1424 configures, supervises and controls the operations of the digital video block.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors and other structures. Photonic integrated circuit blocks, components, and interconnects are also suitably applied in various embodiments.

It is emphasized here that while some embodiments may have an entire feature totally absent or totally present, other embodiments, such as those performing the blocks and steps of the Figures of drawing, have more or less complex arrangements that execute some process portions, selectively bypass others, and have some operations running concurrently sequentially regardless. Accordingly, words such as "enable," disable," "operative," "inoperative" are to be interpreted relative to the code and circuitry they describe. For instance, disabling (or making inoperative) a second function by bypassing a first function can establish the first function and modify the second function. Conversely, making a first function inoperative includes embodiments where a portion of the first function is bypassed or modified as well as embodiments where the second function is removed entirely. Bypassing or modifying code increases function in some embodiments and decreases function in other embodiments.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A method of managing branch prediction, the method comprising:
    initiating execution, by an execution circuit, of a first branch instruction pointing to a target instruction, wherein the target instruction is located in a first memory area;
    detecting, by a logic circuit, execution of a first instruction, the first instruction changing a memory selection from a second memory area to the first memory area;

detecting, by the logic circuit, whether the first branch instruction is within a capture range of the first instruction, after detecting execution of the first instruction; and disabling a branch prediction circuit, in response to detecting that the first branch instruction is within the capture range of the first instruction.

2. The method of claim 1, further comprising executing, by the execution circuit, the first instruction.

3. The method of claim 1, further comprising fetching, by an instruction fetch circuit, the target instruction.

4. The method of claim 1, further comprising:
detecting that a second branch instruction is outside the capture range of the first instruction;
predicting, by the branch prediction circuit, branch behavior comprising a predicted target address of the second branch instruction, wherein the branch behavior is based on a branch target buffer;
fetching, by an instruction fetch circuit, a second instruction from the predicted target address; and
updating, by the branch prediction circuit, the branch target buffer in response to execution of the second branch instruction.

5. The method of claim 4, further comprising suppressing updating of the branch target buffer in response to execution of the first branch instruction, in response to detecting that the first branch instruction is within the capture range of the first instruction.

6. The method of claim 1, wherein the first instruction is a store instruction.

7. The method of claim 1, wherein detecting the execution of the first instruction comprises detecting a match between an instruction address of the first instruction and an address of a set of stored addresses.

8. The method of claim 1, wherein detecting the execution of the first instruction comprises detecting that the first instruction comprises a particular store instruction code.

9. The method of claim 1, wherein detecting the execution of the first instruction comprises detecting a store instruction code to a predetermined register in a memory area of a selection circuit.

10. The method of claim 1, wherein the capture range comprises a predetermined number of instruction addresses.

11. The method of claim 1, wherein the capture range comprises a predetermined number of instructions.

12. The method of claim 1, wherein the capture range comprises a predetermined number of clock counts.

13. The method of claim 1, wherein the first instruction comprises a qualifier for the first instruction.

14. The method of claim 13, where the detecting of whether the first branch instruction is within the capture range of the first instruction is performed based on the qualifier.

15. The method of claim 1, further comprising sending a mis-prediction signal initiating fetching the target instruction, in response to execution of the first branch instruction.

16. An integrated circuit comprising:
an execution circuit operable to receive a first branch instruction that references a target instruction that is within a memory having a plurality of selectable areas;
a branch prediction circuit operable to determine branch prediction information for the first branch instruction;
a memory area selection unit operable to select between the plurality of selectable areas of the memory; and
a logic circuit operable to:
detect execution of a first instruction that causes the memory area selection unit to change between the plurality of selectable areas;
determine whether the first branch instruction is within a capture range of the first instruction; and
in response to determining that the first branch instruction is within the capture range of the first instruction, inhibit the branch prediction circuit from determining the branch prediction information.

17. The integrated circuit of claim 16, wherein:
the execution circuit is further operable to receive a second branch instruction;
the branch prediction circuit is further operable to determine a second set of branch prediction information for the second branch instruction; and
the logic circuit is further operable to, when it is determined that the second branch instruction is beyond the capture range of the first instruction, permit the branch prediction circuit to determine the second set of branch prediction information for the second branch instruction.

18. The integrated circuit of claim 16, wherein the first instruction is a store instruction.

19. The integrated circuit of claim 16, wherein the capture range comprises a predetermined number of instruction addresses.

* * * * *